United States Patent
Schulz et al.

(10) Patent No.: US 7,520,660 B2
(45) Date of Patent: Apr. 21, 2009

(54) MIXER SUSPENSION

(75) Inventors: Daniel Schulz, St. Michael, MN (US);
Oszkar Rohosy, Minneapolis, MN (US);
Aaron Curtis, Eagan, MN (US)

(73) Assignee: Red Devil Equipment Company, Plymouth, MN (US)

( * ) Notice: Subject to any disclaimer, the term of this patent is extended or adjusted under 35 U.S.C. 154(b) by 665 days.

(21) Appl. No.: 11/157,843

(22) Filed: Jun. 22, 2005

(65) Prior Publication Data

US 2006/0002228 A1    Jan. 5, 2006

Related U.S. Application Data

(63) Continuation-in-part of application No. 10/891,446, filed on Jun. 30, 2004, now Pat. No. 7,182,506.

(51) Int. Cl.
*B01F 11/00* (2006.01)
(52) U.S. Cl. ...................................... 366/217
(58) Field of Classification Search ......... 366/108–128, 366/208–217, 219, 605; 74/86; 494/82
See application file for complete search history.

(56) References Cited

U.S. PATENT DOCUMENTS

| | | | | |
|---|---|---|---|---|
| 3,891,191 A * | 6/1975 | Choules et al. | ............. | 366/111 |
| 4,125,335 A * | 11/1978 | Blume et al. | ................ | 366/209 |
| 4,235,553 A * | 11/1980 | Gall | ........................... | 366/208 |
| 4,400,138 A * | 8/1983 | Baer | ........................ | 417/179 |
| 4,422,768 A * | 12/1983 | Solomon | .................... | 366/110 |
| 4,497,581 A | 2/1985 | Miller | | |
| 4,619,532 A * | 10/1986 | Schmidt, III | ................ | 366/110 |
| 5,268,620 A | 12/1993 | Hellenberg | | |
| 5,567,050 A * | 10/1996 | Zlobinsky et al. | ........... | 366/209 |
| 5,639,160 A * | 6/1997 | Kishimoto | .................. | 366/208 |

(Continued)

FOREIGN PATENT DOCUMENTS

DE    19623227 A1 * 12/1997

(Continued)

OTHER PUBLICATIONS

International Preliminary Report on Patentability and Written Opinion of International Application No. PCT/US2005/023623, filed Jun. 6, 2005, both mailed Jan. 18, 2007.

(Continued)

*Primary Examiner*—Charles E Cooley
(74) *Attorney, Agent, or Firm*—Faegre & Benson LLP

(57) ABSTRACT

An improved suspension apparatus and method for damping vibration arising in liquid vortex mixers of the type pivotably supporting a mixing frame assembly and suspending the assembly by at least one spring for mixing a liquid coating using both spin and orbital rotational movements. A pivoting support is located between the mixing frame assembly and a base. A damper in the form of an annular ring is used to damp pivoting movement of the mixing frame assembly. Various pivoting mounts may be used to pivotably support the mixing frame on a base. A bushing provides accommodation of a misaligned spring mounting end turn using a V-groove to retain the spring mounting end turn, and may include an eccentric feature to allow adjustment of the spring mounting length.

18 Claims, 37 Drawing Sheets

U.S. PATENT DOCUMENTS

| | | | |
|---|---|---|---|
| 6,250,792 B1 * | 6/2001 | Krush et al. | 366/128 |
| 6,338,708 B1 * | 1/2002 | Miura et al. | 494/82 |
| 6,575,614 B2 * | 6/2003 | Tosco et al. | 366/114 |
| 6,953,279 B2 * | 10/2005 | Midas et al. | 366/217 |
| 7,059,762 B2 * | 6/2006 | Yi et al. | 366/208 |
| 7,101,077 B2 * | 9/2006 | Esteve et al. | 366/110 |
| 7,296,924 B2 * | 11/2007 | Czarnek | 366/208 |
| 7,448,789 B2 * | 11/2008 | Boquet et al. | 366/110 |
| 2003/0067838 A1 | 4/2003 | Schmidt et al. | |
| 2003/0107949 A1 | 6/2003 | Huckby et al. | |
| 2004/0085855 A1 | 5/2004 | Midas et al. | |
| 2004/0141412 A1 | 7/2004 | Midas et al. | |
| 2006/0002228 A1 * | 1/2006 | Schulz et al. | 366/209 |
| 2006/0002229 A1 * | 1/2006 | Schulz et al. | 366/217 |
| 2008/0080305 A1 * | 4/2008 | Malasky et al. | 366/208 |

FOREIGN PATENT DOCUMENTS

| | | |
|---|---|---|
| EP | 7220 A1 * | 1/1980 |
| EP | 0 274 802 B1 | 7/1988 |
| EP | 995851 A2 * | 4/2000 |
| FR | 2 738 861 A1 | 3/1997 |
| JP | 61161128 A * | 7/1986 |
| JP | 2000-176268 | 6/2000 |
| JP | 2001-246236 | 9/2001 |
| WO | WO 2004/037400 A2 | 5/2004 |

OTHER PUBLICATIONS

Speed Demon 5 Paint Mixer Owner's Manual, Red Devil Equipment Co., Jan. 29, 2003, pp. 1-24.

5900 Case Shaker Owner's Manual, Red Devil Equipment Co., Jun. 2004, pp. 1-24.

Auto Sperse 5600 Paint Mixer Owner's Manual, Red Devil Equipment Co., 1996, pp. 1-13.

* cited by examiner

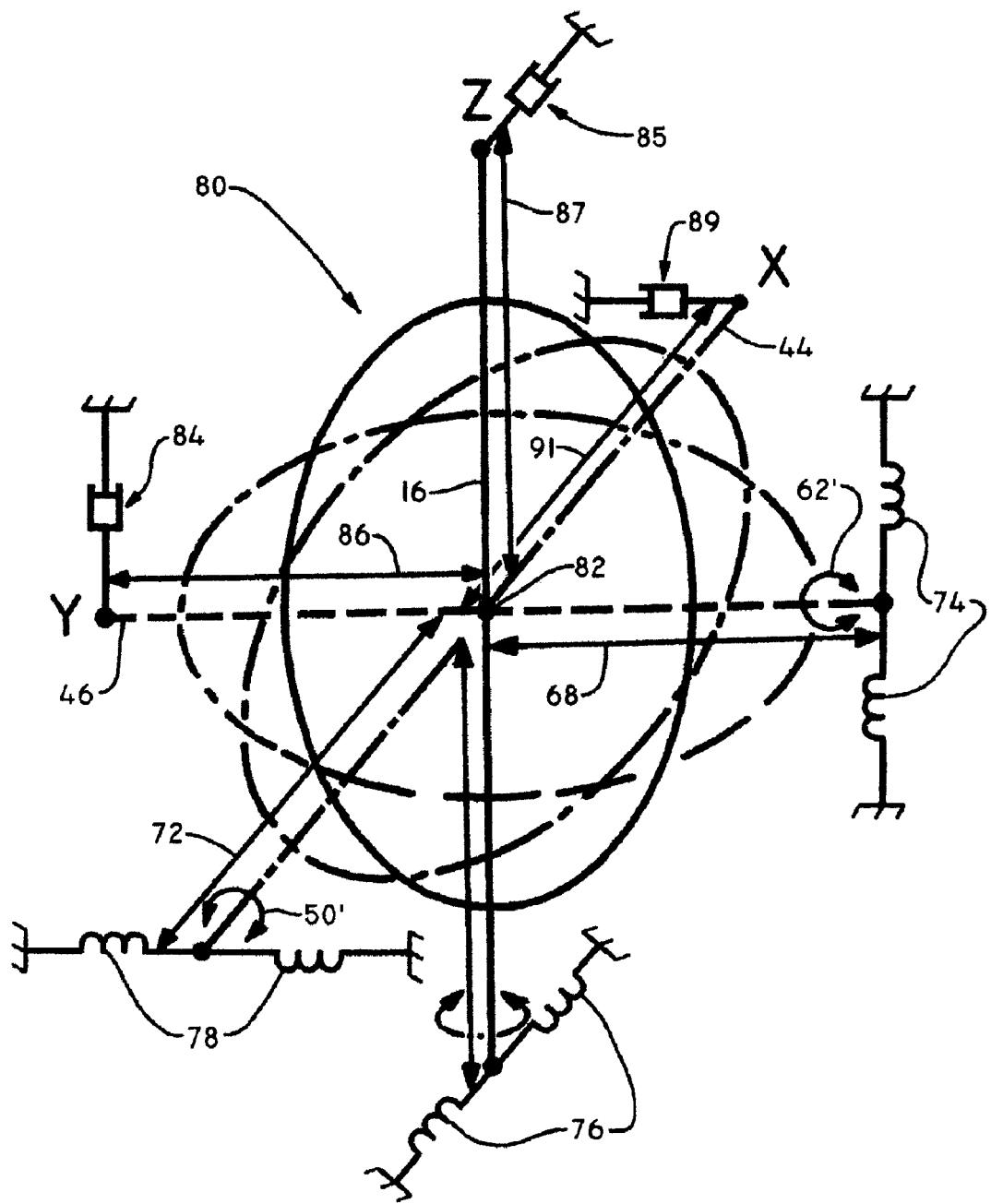

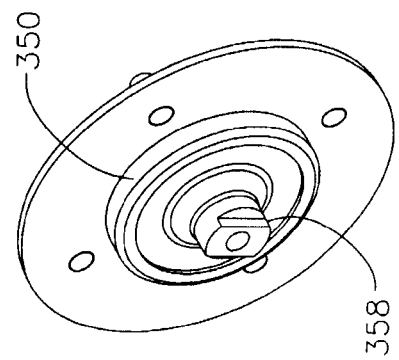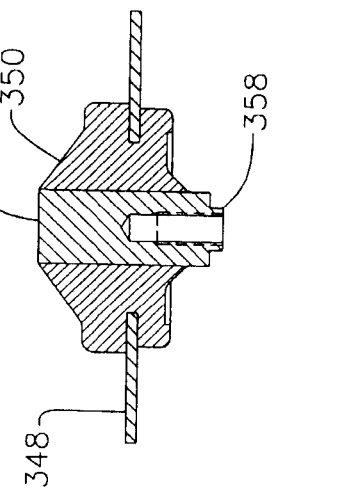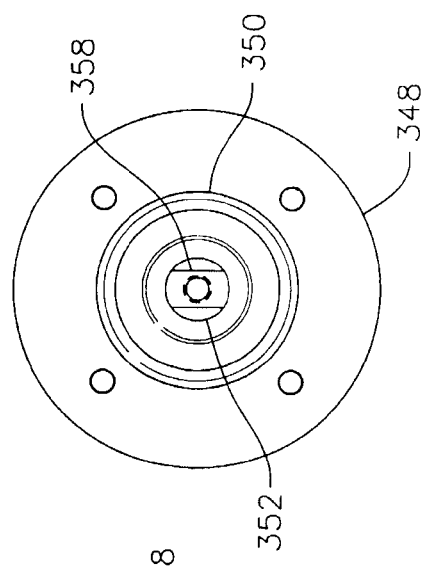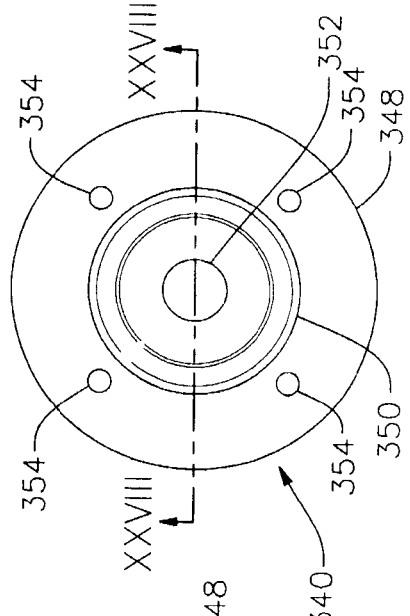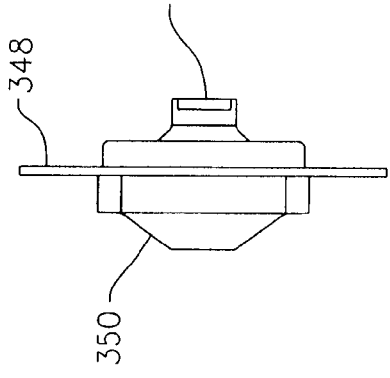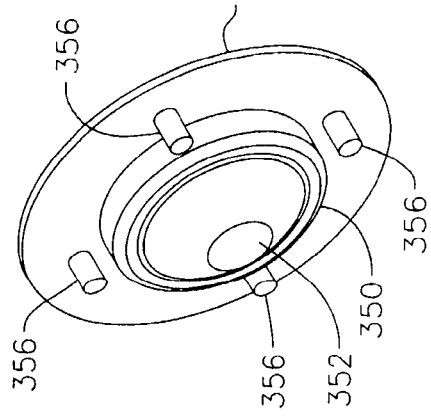

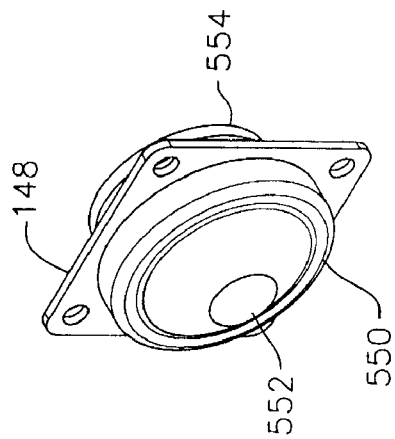
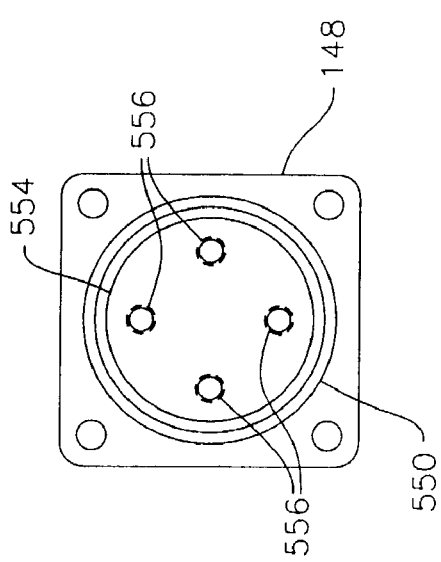
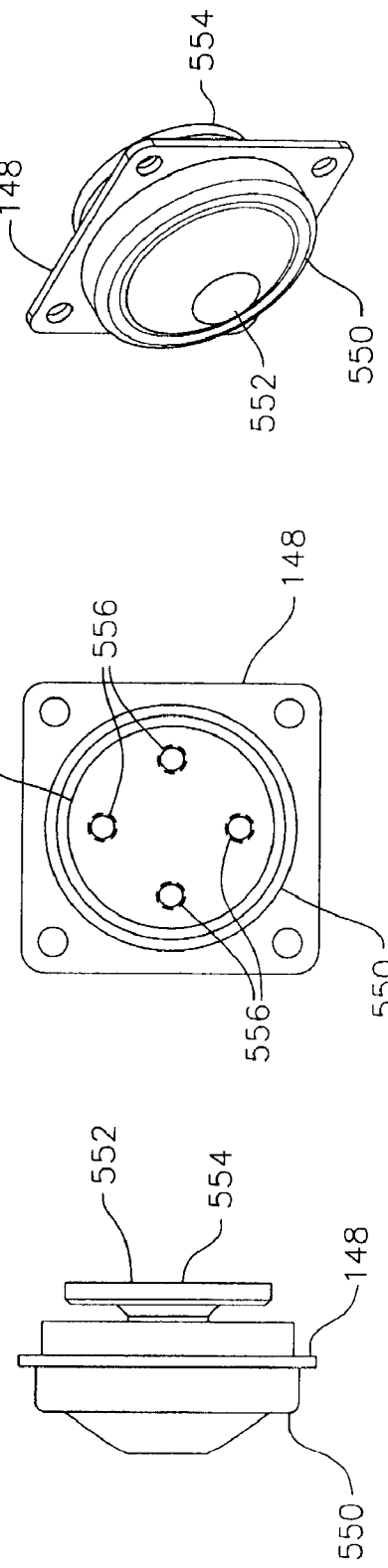
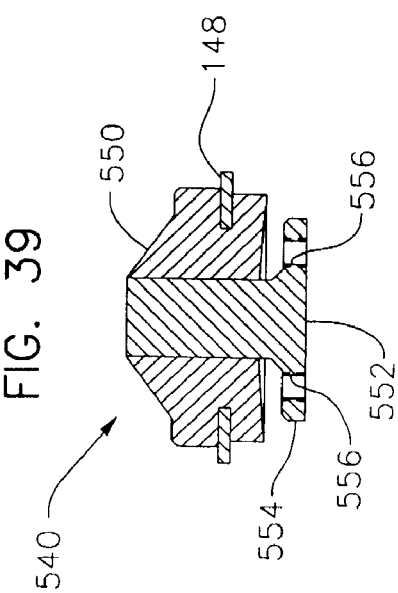
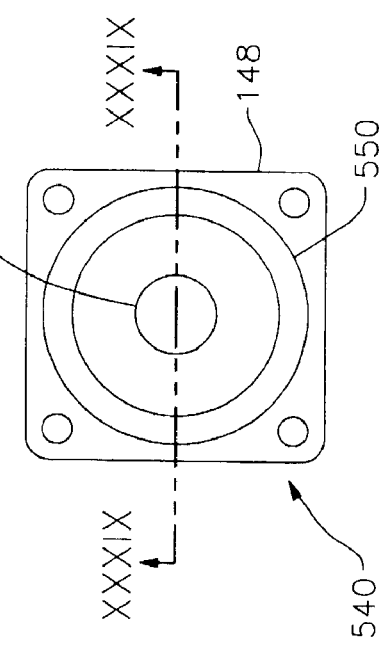

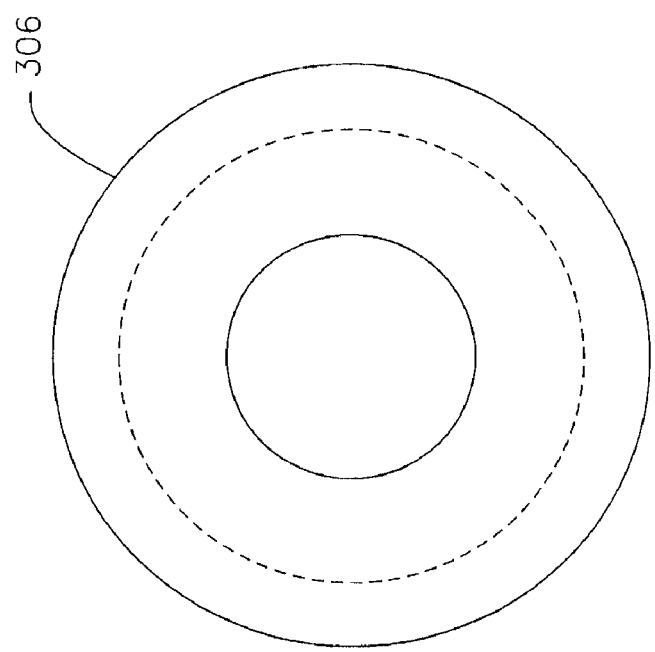
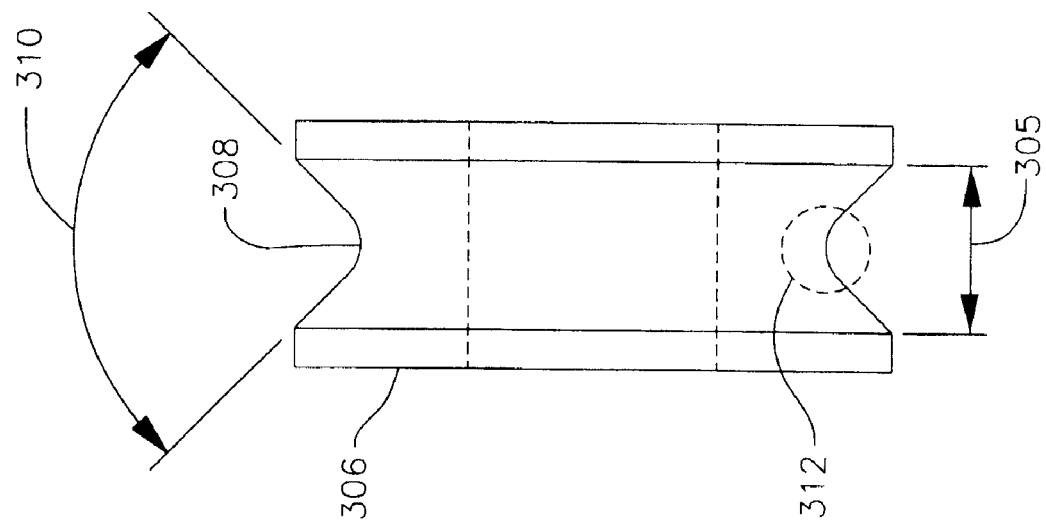

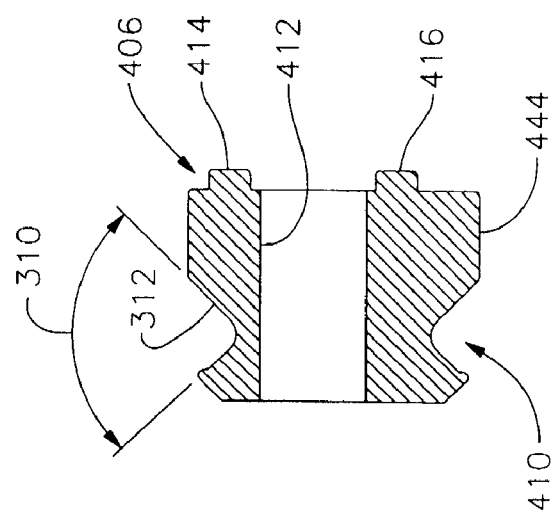
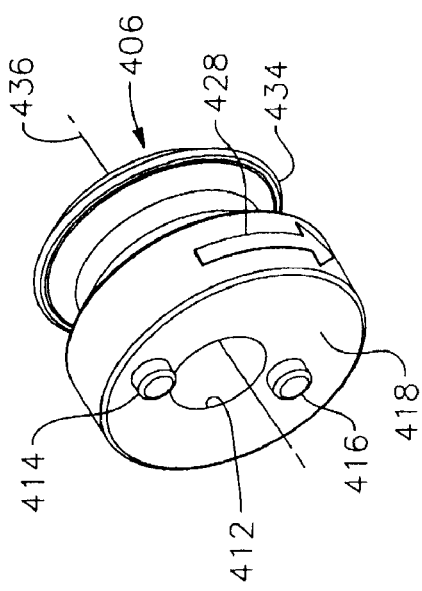
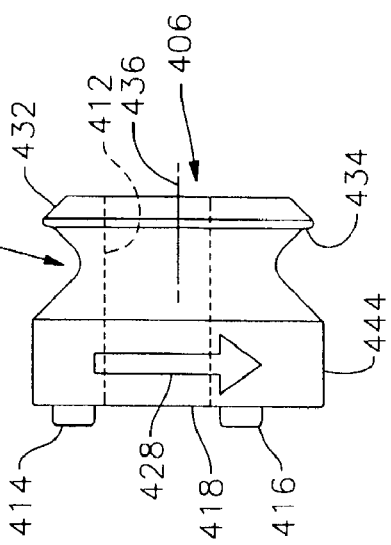
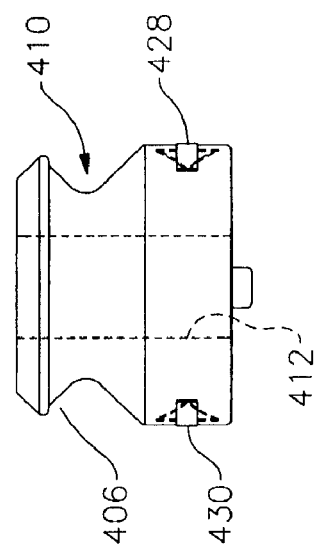
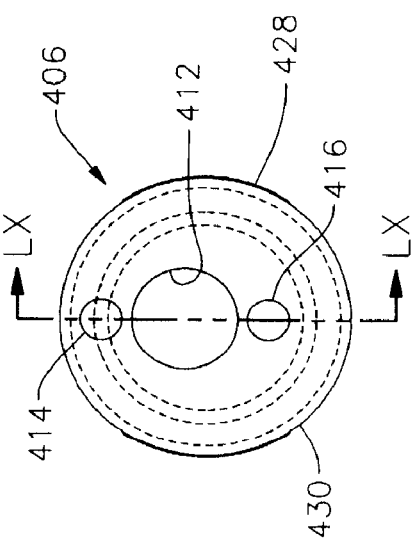

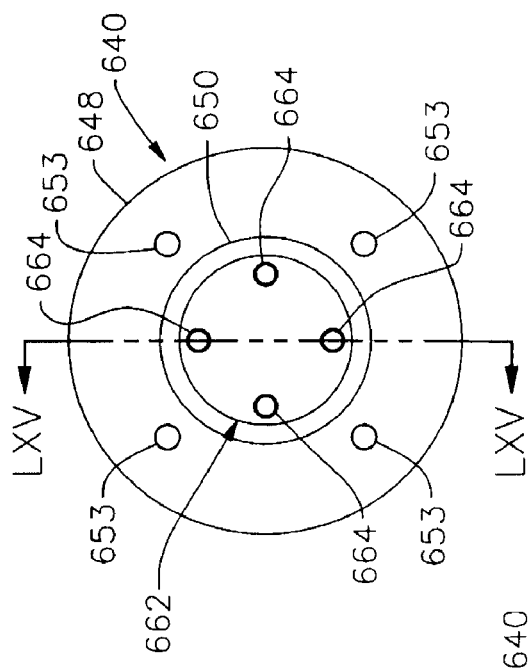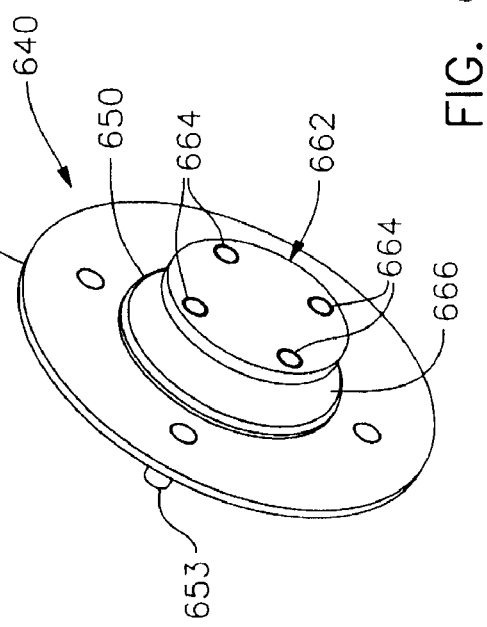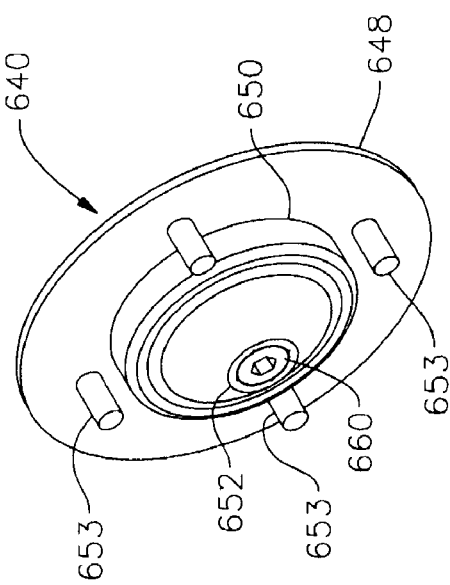

MIXER SUSPENSION

CROSS REFERENCE TO RELATED APPLICATION

This application is a Continuation-In-Part of U.S. application Ser. No. 10/891,446, filed Jun. 30, 2004, now U.S. Pat. No. 7,182,506 B2, the entire contents of which are hereby expressly incorporated by reference.

BACKGROUND OF THE INVENTION

In the past, vortex mixers have been used to mix pigment and vehicle in liquids such as paint, typically in 5 gallon cylindrical containers. Such vortex mixers achieved mixing by spinning the container on its cylindrical axis, while that axis was positioned at an angle to a central orbit axis about which the container was simultaneously orbited as well as spun. While such vortex mixers have enjoyed a degree of popularity, they have also been subject to a certain amount of imbalance, caused by a range of density and viscosity in the materials (typically liquids) being mixed. While a vortex was created in the material being mixed, the vortex assumed different shapes and positions within the container, depending upon the density and viscosity of the material being mixed and the spin and orbit speeds of the mixer. While most applications of the present invention contemplate that the materials to be mixed are liquid, other materials may be considered, and, in the event of non-liquid materials (such as granular materials) a concept of apparent or equivalent viscosity would be relevant thereto.

Some prior art mixers had a center of volume offset from the center of rotation such that the center of mass was displaced in one direction with an empty machine, and the center of volume was displace in an opposite direction, such that adding a mass of material to be mixed brought the rotating elements somewhat into balance. However, such balance was only achieved with one volume, density and viscosity of material to be mixed.

Imbalance in prior art mixers manifested itself in vibration of the mixer, sometimes resulting in the mixer "walking" or moving laterally across the surface upon which it was supported. Such walking is undesirable, particularly when the mixer is located on a surface elevated above a floor, as for example, when the mixer is "stacked" on top of other equipment as is sometimes done in paint mixing facilities.

The present invention relates to various aspects of and improvements to the suspension shown and described in copending application Ser. No. 10/891,446, assigned to the same assignee hereof. The suspension provides improved performance for vortex mixers of the type described herein. In alternative embodiments, various pivoting support embodiments may be found useful in the practice of the present invention, along with an annular damper formed of viscoelastic polymer, which has been found to be a desirable embodiment and is included herein. Improved spring mounting arrangements are also included herein.

SUMMARY OF THE INVENTION

In one aspect the present invention includes an improved suspension system in the form of apparatus and method for a mixer of the type having a mixing frame assembly mounted by a pivoting support to the base of the mixer and thereby supported for angular movement about the pivot. More particularly, the improvement includes at least one damper element, preferably in an annular concentric orientation to the pivot. The damper element may, but need not be in the form of a damper pad or ring.

In a further aspect, the present invention includes providing a predetermined preload to the at least one damper element. The preloading may be chosen to provide additional damping effectiveness; furthermore, preloading may also (or alternatively) be used to provide self-leveling for the mixing frame when it is at rest.

In a further aspect, the present invention includes an indexing structure associated with the pivot to positively orient the mixing frame assembly to the base. The indexing structure may be formed integral with the pivoting support or may be a separate part attached to the pivoting support.

In a further aspect, the present invention includes an improved spring mounting bushing arrangement having a bushing with a V-groove accepting an end turn of a helically wound tension spring, with an included angle of the V-groove allowing a relatively loose fit of the end turn in the V-groove. Providing such a loose fit enhances the ability of the spring mounting bushing to react to and recover from misalignment of the spring end turn and the bushing, returning the end turn into proper alignment after the end turn is dislodged from the bushing as a result of a shock load. In one embodiment the bushing is free to rotate, and in another embodiment, the bushing is fixed against rotation. In a further aspect, the fixed bushing may include an eccentric adjustment feature to allow selection from among a plurality of mounting lengths for the springs of the present suspension. In a still further aspect, the present invention provides the convenience of a degree of self-leveling of the mixing frame assembly when it is at rest.

BRIEF DESCRIPTION OF THE DRAWINGS

FIG. 3A is a simplified 3 dimensional force diagram to illustrate certain aspects of the present invention.

FIG. 23 is a side view of an alternate pivoting support.

FIG. 24 is a plan view of one side of the pivoting support of FIG. 23.

FIG. 25 is a perspective view of one side of the pivoting support of FIG. 23.

FIG. 26 is a perspective view of the other side of the pivoting support of FIG. 23.

FIG. 27 is a plan view of the other side of the pivoting support of FIG. 23.

FIG. 28 is a section view taken along line XXVIII-XXVIII of FIG. 27.

FIG. 35 is a side view of an alternate pivoting support.

FIG. 36 is a plan view of one side of the pivoting support of FIG. 35.

FIG. 37 is a perspective view of one side of the pivoting support of FIG. 35.

FIG. 38 is a plan view of the other side of the pivoting support of FIG. 35.

FIG. 39 is a section view taken along line XXXIX-XXXIX of FIG. 35.

FIG. 41 is a side view of a spring attachment ring useful in the practice of the present invention.

FIG. 42 is a plan view of the spring attachment ring of FIG. 41.

FIG. 56 is a first side view of the alternative mounting bushing of FIGS. 44 and 54.

FIG. 57 is a perspective view of the alternative mounting bushing of FIG. 56.

FIG. 58 is an end view of the alternative mounting bushing of FIG. 56.

FIG. 59 is a second side view of the alternative mounting bushing with the bushing rotated 90 degrees about a cylindrical axis thereof with respect to the view shown in FIG. 56.

FIG. 60 is a section view along line LX-LX of FIG. 58.

FIG. 61 is a perspective view of another embodiment of the pivoting support

FIG. 62 is a plan view from one side of the pivoting support of FIG. 61.

FIG. 63 is a perspective view of the pivoting support of FIG. 61.

DETAILED DESCRIPTION OF THE INVENTION

Figure 1:
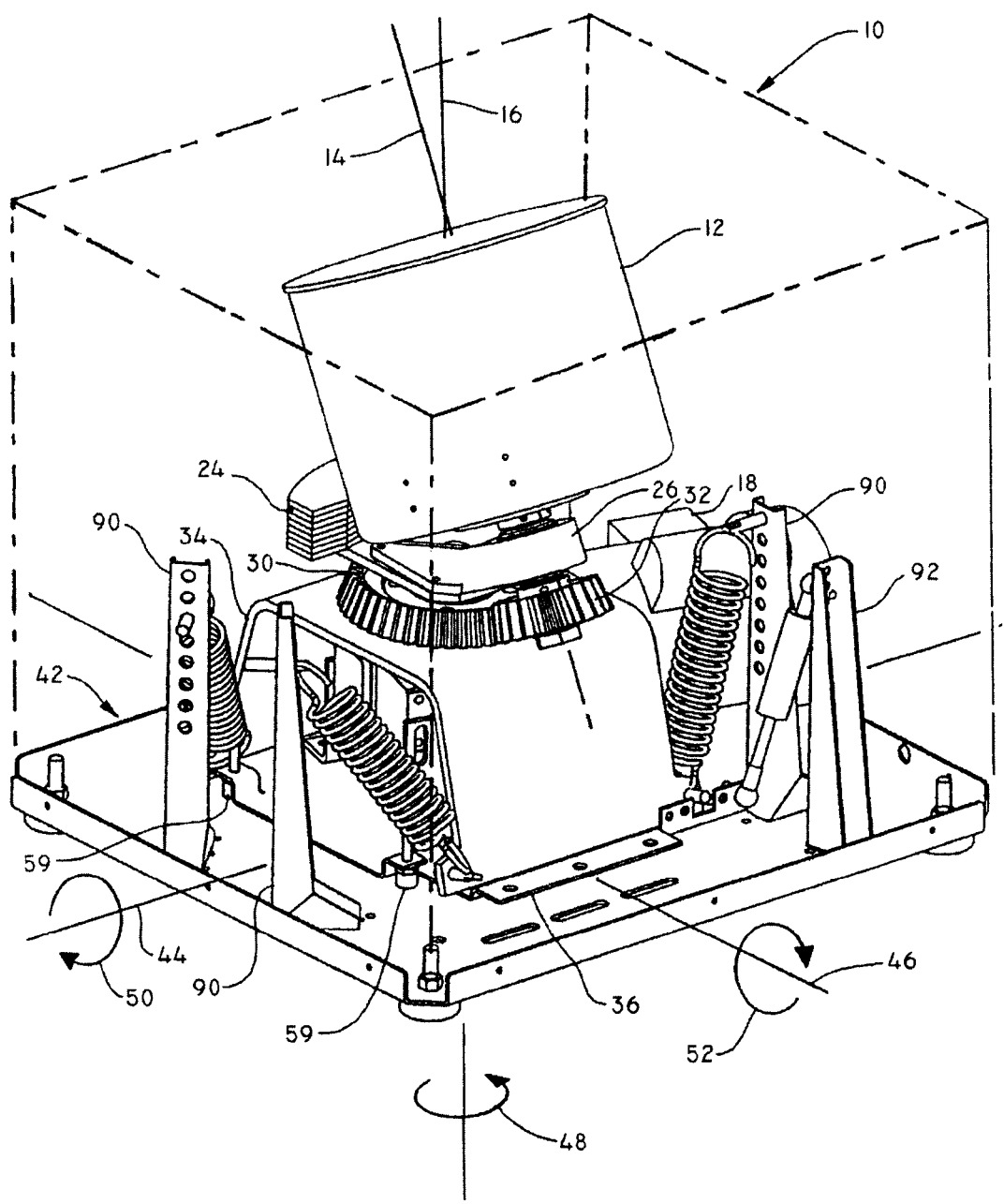
FIG. 1 is an assembly view of an embodiment of the present invention in the form of a vortex mixer with single pivot support and with an enclosure shown in phantom.

The present invention is directed to design goal of improving suspension of a mixing frame assembly in a mixing machine.

It has been found preferable to decrease a gear reduction ratio between an electric motor driving the mixer to increase both the spin and orbit rotational speeds resulting in improved mixing action. However, when this is done, it is also desirable to increase machine stability.

A deficiency in some prior art designs was that the machine was not balanced in certain conditions.

The mixer of the present invention has been designed to seek balance for the mixing machine in all configurations, including i) empty, ii) loaded with 5 gallon bucket, and iii) loaded with 1 gallon can using an adapter. Balance is achieved in the empty state by balancing all rotating components. The best balance in the other configurations is achieved by positioning the paint container average center of mass on both a spin axis and an orbit axis.

Because paint is approximately homogeneous, positioning the center of volume also generally positions the center of mass. It has been found, however, that rotational balance is dependent on the density and viscosity of the paint or other material to be mixed. As used herein, the term "paint" is understood to include paint and all other similar liquid coatings requiring mixing, typically to blend pigment and vehicle.

Another aspect of the mixer disclosed herein improves machine isolation by decreasing machine resonance frequencies in the 3 rotational degrees of freedom (DOF) (rotation around three mutually orthogonal x, y, and z axes). The resonance frequency or frequencies are decreased to a point substantially less than the driving frequencies which correspond to the rotational velocities of the spin and orbit motions. It has been found that reducing the resonance frequency to be less than or equal to $1/\sqrt{2}$ times the lowest driving frequency or approximately 0.7 times the lowest driving frequency is desirable.

A machine's natural frequency is a function of mass and spring rate. Because the mass of the coating liquid load varies, the machine's natural frequency varies. A deficiency of some prior art designs was that the spring rate(s) of the isolators was very stiff, resulting in the machine operating at or near resonance with certain liquid product weights. Decreasing the spring rate significantly in the present invention brings the natural frequency (with and w/o product) much below the operating frequency.

A decrease in the spring rate in all 6 degrees of freedom (DOF) is not particularly desirable due to issues with loading (the can holder is not stable, and tends to move when the operator bumps the holder while loading). In addition, shipping the machine is complicated when all 6 DOF are left 'loose'.

In connection with the present mixer, it has been determined that it is desirable to isolate the rotational DOF, while the translational DOF can be ignored (or positively restrained). Using a pivoting support such as a ball joint between a base of the machine and a mixing frame assembly carrying the paint container holder to allow rotational movement, but restricting translation between the mixing frame assembly and the base, allows more stability when loading liquid product into the mixer, and makes the mixer easier to prepare for shipment.

It has also been found desirable to add one or more dampers to decrease transmissibility when the machine spins up, and down (passing through resonance).

It has been found convenient, (but not essential) to match resonance frequencies in the 3 rotational degrees of freedom, to result in fewer natural frequencies.

It has also been found convenient, but not essential, to balance the mass cross the center plane running vertically along the lateral centerline of the machine (dividing the machine left-right).

Referring to the Figures, and most particularly to FIG. 1, a vortex mixer 10 embodying the present invention may be seen. Mixer 10 has a paint container holder 12 in the form of cylindrical bucket adapted to receive a paint container, typically cylindrical. The mixer 10 shown is sized to mix paint in a 5 gallon container, but it is to be understood that the present invention is not limited to any particular size of paint container. To mix the paint, the mixer 10 rotates the holder 12 about a spin axis 14 and an orbit axis 16.

Figure 2:
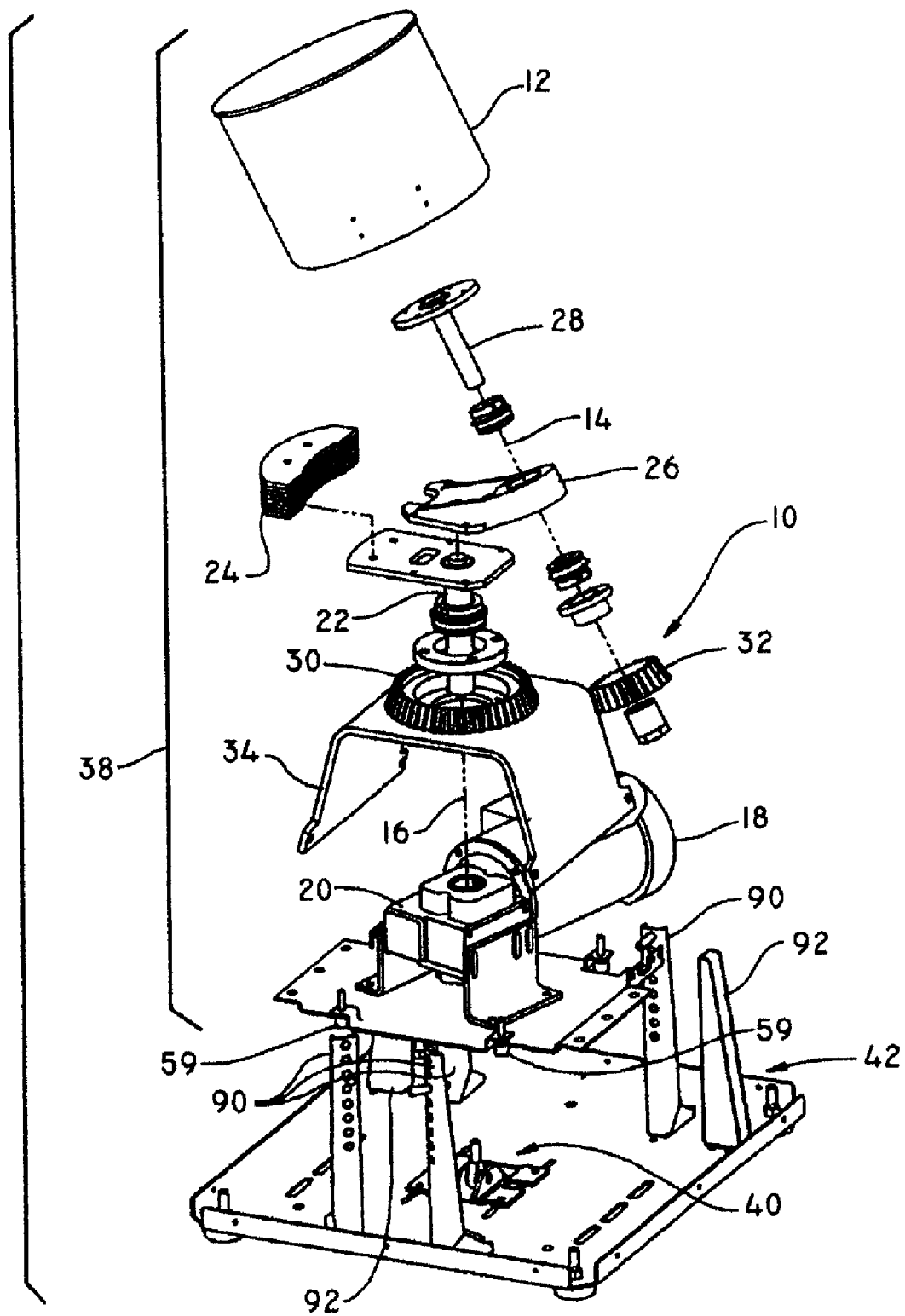
FIG. 2 is an exploded view of the vortex mixer of FIG. 1 with parts omitted for clarity.

Referring now also to FIG. 2, an electric motor 18 operates through a tight angle gear reducer 20 to rotate an orbit shaft 22 carrying a counterweight 24 and a rotating arm 26 on which the holder 12 is mounted using a spin shaft 28 supported for rotation about a stationary bevel ring gear 30 via a pinion gear 32. Gear 30 is supported by a top mix frame element 34 which is fastened to a bottom mix frame member 36. The components of the holder 12 through the bottom mix frame member 36 make up a mixing frame assembly or paint container holder assembly 38, which may or may not also include the liquid paint and container (not shown).

Mixing frame assembly 38 is supported by a single pivoting support 40 on a base 42. Support 40 permits the mixing frame assembly to pivot about base 42 in at least two directions (and in some embodiments, three directions), and may prevent substantial lateral or linear motion between assembly 38 and base 42. For convenience, three mutually orthogonal axes 16, 44, and 46 are shown in FIG. 1, with conventions assigned as follows: axis 16 is a "z" axis, axis 44 is an "x" axis, and axis 46 is a "y" axis. The pivoting or rotational directions of yaw, pitch and roll about the z, x and y axes are indicated, respectively by arrows 48, 50, and 52. It is to be understood that these conventions are arbitrary and not limiting. Furthermore, the directional arrowheads on arrows 48, 50, and 52 are arbitrary and not to be taken as limiting. (Corresponding rotational directional arrows 48', 50', and 52' in the following drawings are to be understood to be bidirectional.)

A plurality of elastomeric bumpers 59 are provided to act as cushions at the end of travel for the movement of the mixing frame assembly 38 when it comes into contact with base 42, for example, while loading or unloading the paint container from the holder.

Figure 2A:
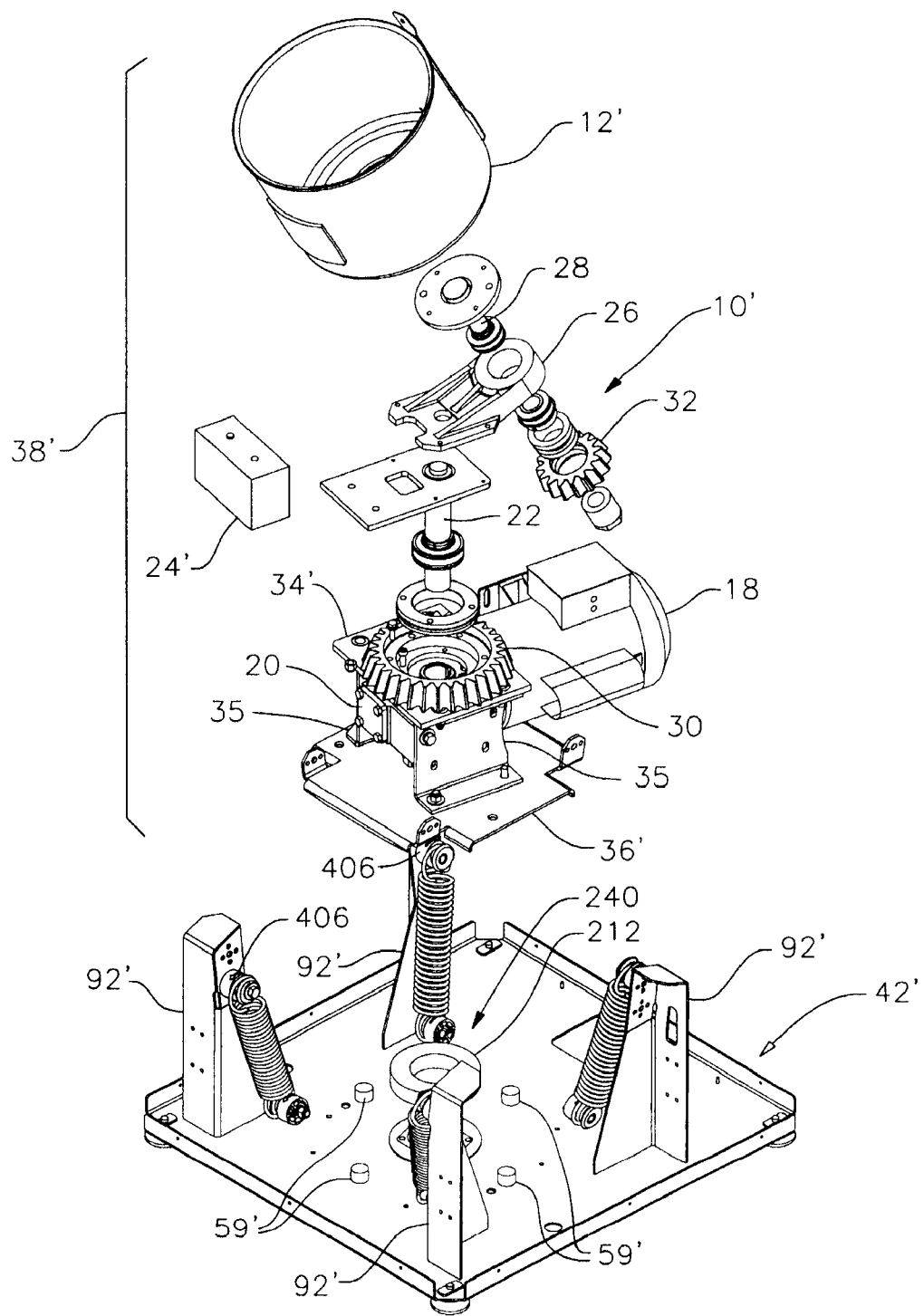
FIG. 2A is an exploded view of an alternative embodiment of the vortex mixer of FIG. 1 with parts omitted for clarity.

Referring now to FIG. 2A, an exploded view of an alternative embodiment 10' of the mixer 10 shown in FIGS. 1 and 2 may be seen. This embodiment has the same electric motor 18 operating through the right angle gear reducer 20 to rotate the orbit shaft 22 carrying a counterweight 24' and the rotating arm 26 on which a holder 12' is mounted using the spin shaft 28 supported for rotation about the stationary bevel ring gear 30 via the pinion gear 32. Holder 12' may be the same as holder 12, if desired. The embodiment 10' of FIG. 2A differs from that shown in FIG. 2 in that the top mix frame element 34 has been replaced by a gear support plate 34' mounted to the pair of brackets 35 for gear reducer 20. In this embodiment, gear 30 is mounted to gear support plate 34'. The brackets 35 are fastened to a modified bottom mix frame member 36'. The components of the holder 12' through the bottom mix frame member 36' make up a modified mixing frame assembly or paint container holder assembly 38', which may or may not also include the liquid paint and container (not shown in FIG. 2A).

In this embodiment, modified mixing frame assembly 38' is preferably supported by an improved pivoting support 240 on a modified base 42'. Similar to the embodiment shown in FIG. 1, support 240 permits the mixing frame assembly to pivot about the base in at least two directions, (while limiting or substantially preventing rotation about the z or orbit axis 16 which is coincident with an axis of shaft 22). Support 240 also preferably prevents substantial lateral or linear motion between assembly 38' and base 42'. It is to be understood that the three mutually orthogonal axes 16, 44, and 46 shown in FIG. 1 (together with conventions assigned thereto) are applicable to the embodiment shown in FIG. 2A. As with respect to FIG. 1, it is to be understood that the conventions and arrowheads are arbitrary and not limiting, with corresponding rotational directional arrows 48', 50', and 52' in the following drawings being understood to be bidirectional.

In the embodiment shown in FIG. 2A, a plurality of elastomeric bumpers 59' are provided on base 42' to act as cushions at the end of travel for the movement of the mixing frame assembly 38' when approaches contact with the base, for example, while loading or unloading the paint container from the holder. It is also to be noted that in the embodiment of FIG. 2A, the spring mounting arrangements, including the towers 92' and end mounting bushings 406 are different from those shown in FIG. 2, and are described in more detail infra. Also as will be described in more detail infra, the functions of dampers 84, 85 and 89 have are accomplished using a viscoelastic ring 212.

Figure 3:
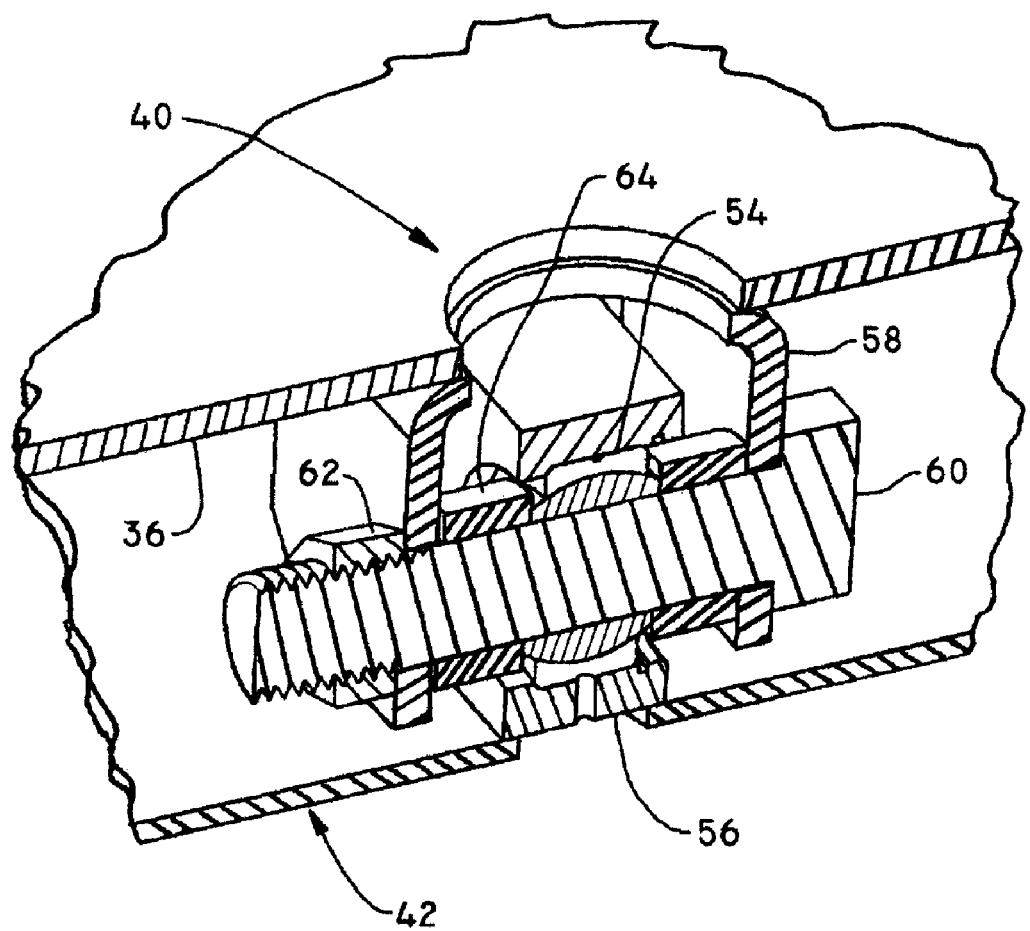
FIG. 3 is a fragmentary detail view of a single pivot support useful in the practice of the present invention.

FIG. 3 is an enlarged fragmentary view of an alternative pivoting support 40 using a spherical bearing 54 with a bearing retainer block 56 and a U-shaped flange 58, secured together by a machine screw 60, nut 62, and spacers 64. Flange 58 is preferably welded to the underside of bottom mix frame weldment plate 36, and retainer block 56 is preferably secured to base 42 by a pair of machine screws 66 (see FIG. 6). It is to be understood that other structures may be used for the pivoting support, such as a clevis and pin arrangement, a universal joint, or an elastomeric mounting device. Furthermore, it is to be understood that in the practice of the present invention, the roll, pitch and yaw axes do not necessarily need to pass through a single point, but may in fact be displaced, if desired. However, one desirable aspect of a paint mixer is to reduce the height to which a paint container must be lifted to be inserted into the holder 12, and consequently, it has been found desirable to have the height of the pivoting support 40 be minimized to the extent practicable.

FIG. 3A is a simplified 3 dimensional force diagram to illustrate certain aspects of the present invention. An idealized or simplified conceptual model 80 includes three pair 74, 76, 78 of springs perpendicular to each of the x, y and z axes 44, 46, 16.

The equivalent moment arm or radius that each pair of springs acts through is indicated by dimensions or radii 68, 70, and 72. Roll springs 74 act through the roll radius 68, to react to roll motion in the roll rotational directions indicated by arrow 50'. Pitch springs 76 act through the pitch radius 70 to react to pitch motion in the pitch rotational directions indicated by arrow 52'. Yaw springs 78 act through the yaw radius 72 to react to yaw motion in the yaw rotational directions indicated by arrow 48'. The equivalent mass and mass moment of inertia for each of the three rotational directions or degrees of freedom are to be understood to be centered at the origin 82 of model 80. It is to be understood that the origin 82 corresponds to one or more pivot points in the pivoting structure, whether one or more than one pivot point (i.e., there may be separate or congruent pivot points for each axis of rotation) exists in the pivoting structure.

Each of the x, y and z (roll, pitch and yaw) axes may be characterized by a plane perpendicular to the respective axis, and a two dimensional model for determining the natural frequency in each of the planes may be represented by Equation (1):

$$\omega_n = (k_t/J)^{1/2} \quad (1)$$

where $\omega_n$ is the natural frequency, $k_t$ is an effective torsional spring constant, and J is the mass moment of inertia about the rotational axis of interest (of the mixing frame assembly 38) taken with respect to the pivot point for that axis in the pivoting structure.

In the simple model, if damping is present, $$\zeta = \lambda/2(k_t J)^{1/2} \quad (2)$$

where $\zeta$ is the damping coefficient and $\lambda$ is the scalar coefficient of a damper according to:

$$F = \lambda dL/dt \quad (3)$$

where F is the force produced by the damper, and dL/dt is the velocity at which parts on either side of the damper move. It is to be understood that one or more equivalent dampers may be added to one or more of the axes in parallel with one or more of the springs 74, 76, 78, it being understood that each damper may be located at a different radius than its corresponding spring, with consequent difference in leverage with respect to the respective axis on which it acts. In FIG. 3A, a roll damper 84 is illustrated at a damper radius of dimension 86 to damp roll motion 50 about the x or roll axis 44. Similarly, a pitch damper 85 is illustrated at a pitch damper radius 87 to damp pitch motion about the y or pitch axis 46. A yaw damper 89 is shown schematically at a yaw damper radius 91 to retard yaw rotational motion about the z or yaw axis 16.

The frequency at which a forcing function will result in an undamped or underdamped system exhibiting its peak amplitude response is the resonant frequency. For undamped systems, the resonant frequency and natural frequency are the same. For underdamped systems with damping (i.e., $\zeta < 1$) the resonant frequency is related to the natural frequency through the damping coefficient $\zeta$ by equation (4):

$$\omega_{resonance} = \omega_n (1-\zeta^2)^{1/2} \quad (4)$$

Thus it can be seen that the resonant frequency is less than the natural frequency for such underdamped systems, but as damping is reduced, the resonant frequency converges to the natural frequency.

In the model illustrated in FIG. 3A, the springs and damper are shown located perpendicular to the moment arms (radii) through which they act on the mass having its respective polar moments of inertia centered at 82. However, in practice, it has been found desirable to reposition the springs (and dampers if any) to react with the mass and respective rotational inertial components of the mixing frame assembly, both to reduce the volume that would otherwise be needed (if the springs and dampers were perpendicular to the moment arms as shown in FIG. 3A) and also because it has been found desirable to have the individual actual springs and damper or dampers react to rotation motion in more than one direction or DOF. In other words one actual spring can serve as an effective spring in two or three rotational dimensions. Similarly, one actual damper can serve as an effective damper in multiple dimensions. For symmetry and balance, however, it has been found preferable to have the springs operate in pairs on opposite sides of the pivoting support.

It is also desirable to have a compact "footprint" or small plan view area for vortex paint mixers, to make efficient use of the space needed for the mixer. To that end, the suspension system of the present invention is "folded" or collapsed to reduce the mixer footprint. While the "unfolded" condition of the suspension system is shown in FIG. 3A, in practice it is desirable to reduce the size of the space required by the suspension system of the present invention. Furthermore, by realigning the springs and damper or dampers in the practice of the present invention, one actual spring can be made to deliver forces equivalent to two or more theoretical springs illustrated in FIG. 3A., thus reducing the cost as well as the size of the mixer embodying the present invention.

Referring now most particularly to FIGS. 4-7, certain views of the base 42 and suspension 88 for the mixing frame assembly 38 of the present invention may be seen. It is to be understood that the design of suspension 88 is symmetric about line VI-VI in FIG. 5, but such symmetry is not required in the practice of the present invention. Comparing the embodiment shown in these Figures with that of FIGS. 1 and 2, it may be seen that in the practice of the present invention, either individual towers 90 may be used or combined towers or upright members 94 may be used for the springs. In FIGS. 1 and 2, each spring is supported by a separate tower 90, forming a first plurality of towers. Using such an arrangement allows each spring to be individually oriented to the mixing frame assembly 38 as desired. In the embodiment shown in FIGS. 4-12, a pair of towers or upright members 94, 96 may each be used to support a pair of springs. More particularly, a front member 94 supports a first pair of springs 98, 100 at the front of mixer 10, and a rear member 96 supports a second pair of springs 102, 104 towards a rear of mixer 10. It is to be understood that side members may be used instead of front and rear members in an alternative embodiment (not shown) in the practice of the present invention. Furthermore, various other combinations of spring and damper supports may be used, for example, a single upright member (not shown, but similar to a combined version of members 94 and 96) while remaining with the scope of the present invention.

Since the design shown in FIGS. 4-12 is symmetric about line VI-VI, only one side will be described, it being understood that the following description applies equally to parts for the other side. Front spring 98 is angled towards the mixing frame assembly in three dimensions (i.e., it is not aligned parallel to any of the x, y, or z axes as shown, for purposes which will be described infra. Spring 102 is shown generally parallel to the x-z plane, but may be angled, as indicated by dashed line 106, if desired, while still remaining within the scope of the present invention. If used, a damper 108 may be oriented in a two or three dimensional angle, again according to principles described infra.

Figure 5:
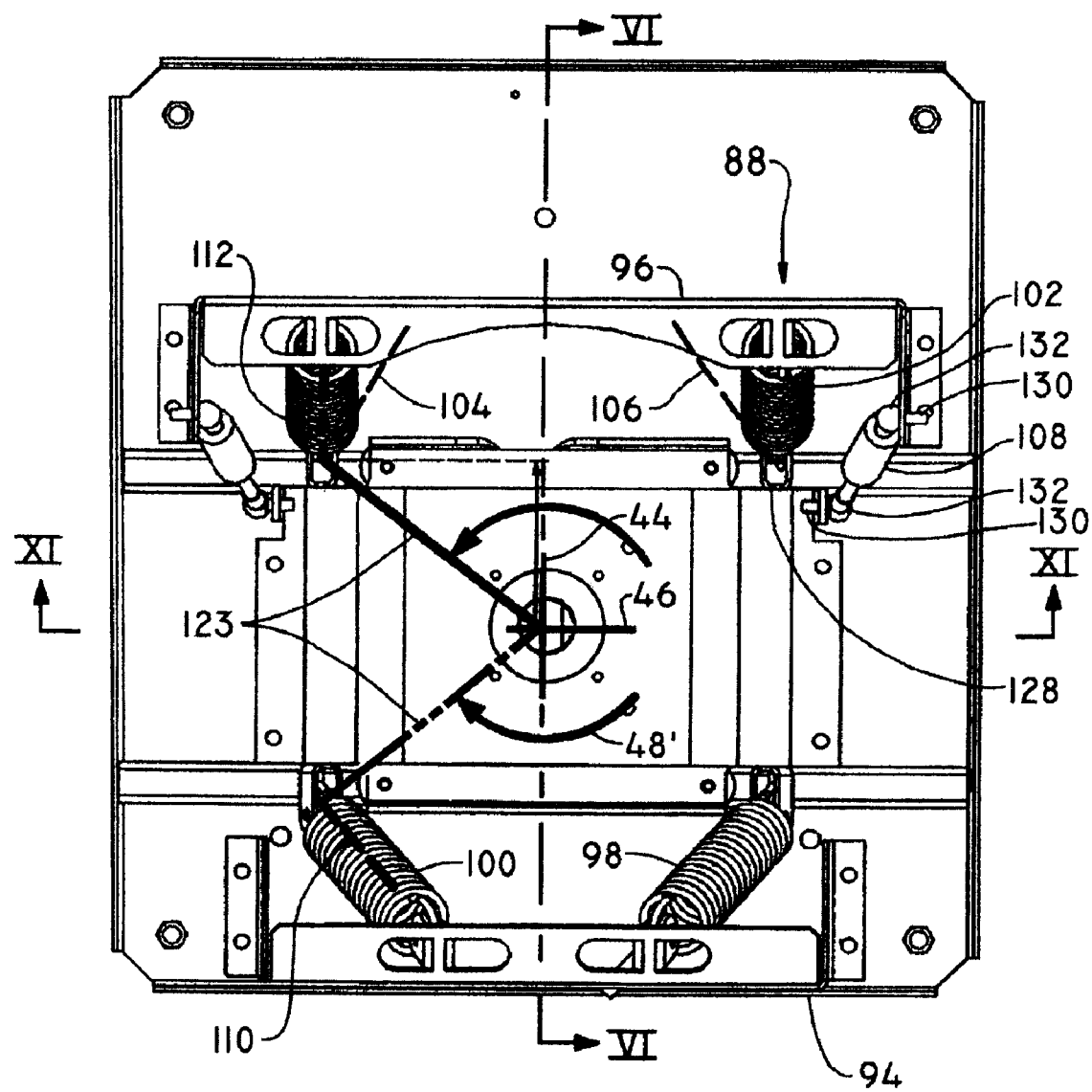
FIG. 5 is a top plan view of suspension parts for the vortex mixer according to FIG. 4, illustrating certain details of the present invention.

In FIG. 5, viewing the mixer parts perpendicular to the x-y plane, it may be seen that vector components of the respective forces of springs 100 and 104 will exist in the x-y plane along dashed lines 110 and 112 to counteract a yaw rotational movement 48' of the mixing frame assembly 38.

Figure 6:
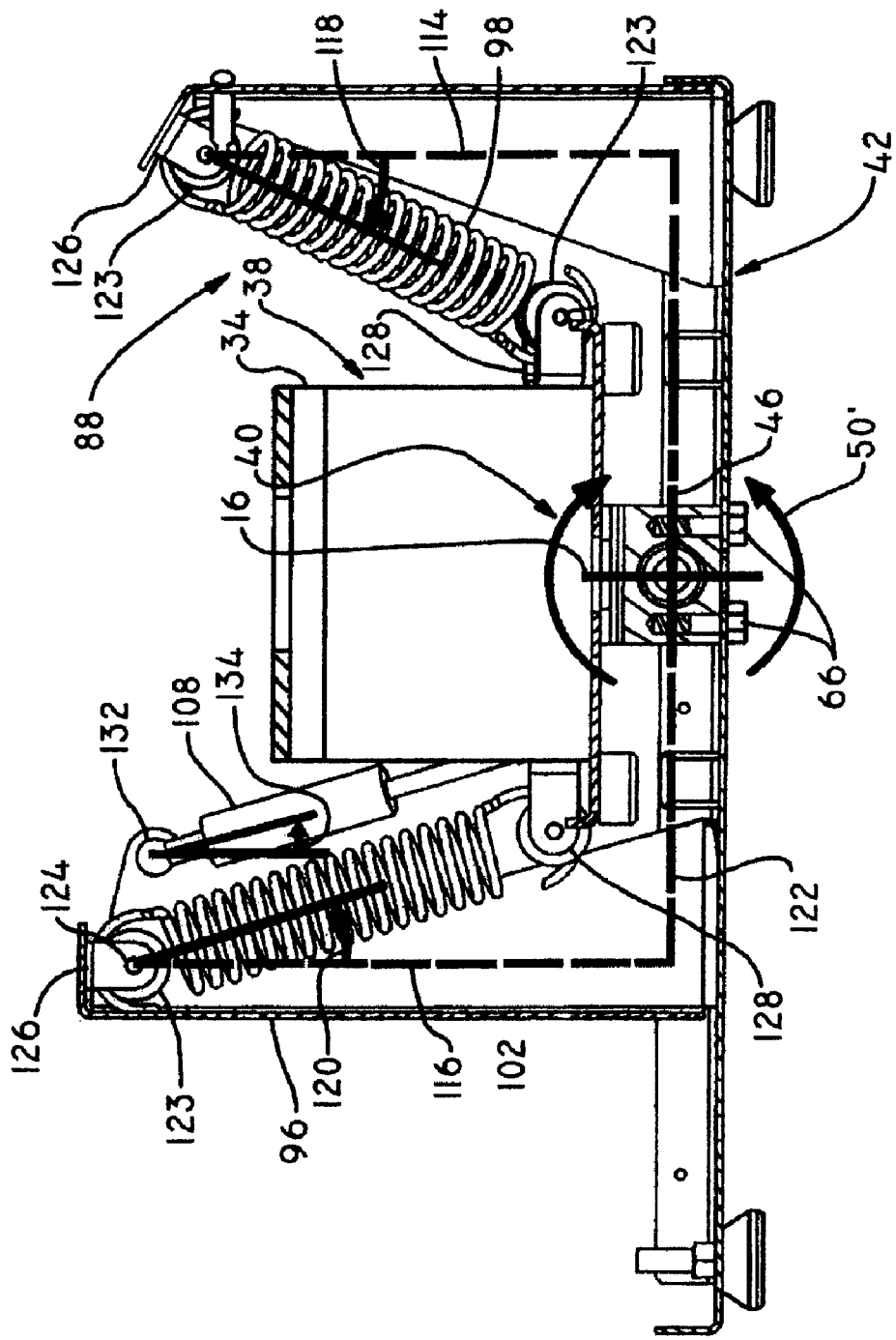
FIG. 6 is a side elevation section view of the parts shown in FIG. 5, taken along line VI-VI of FIG. 5.
Figure 7:
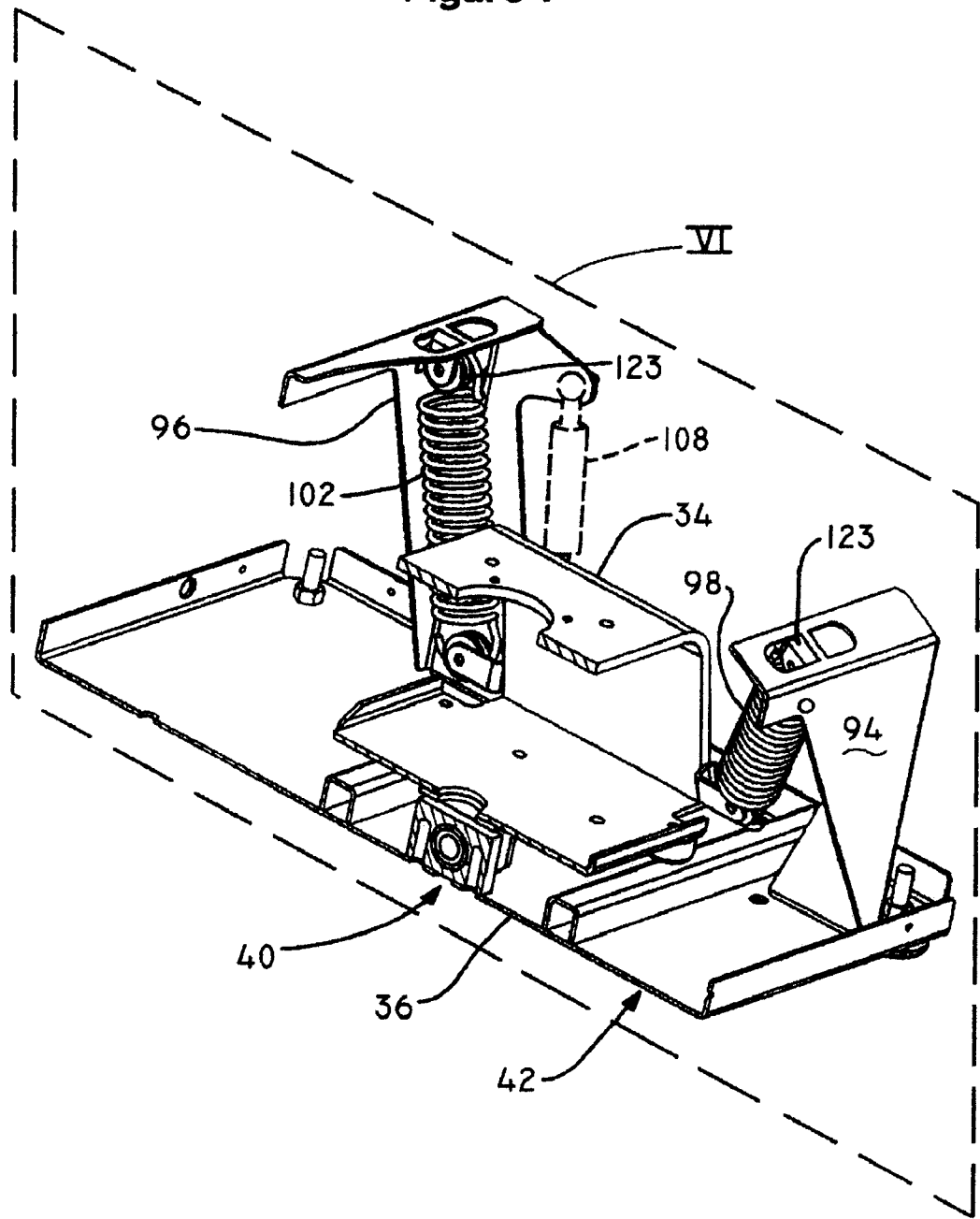
FIG. 7 is a perspective view of the parts shown in FIG. 6, along with the section plane VI.

In FIG. 6, viewing the mixer parts perpendicular to the x-z plane, it may be seen that vector components of the respective spring forces of springs 98 and 102 will exist in the x-z plane along dashed lines 114 and 116, respectively, to counteract pitch rotational movement 50' of the mixing frame assembly 38, because springs 98 and 102 are positioned at angles 118, 120, respectively. A similar effect will be produced for roll rotational movement. It may be noted that the vector components along the dashed lines mentioned correspond to certain of the springs shown in the model of FIG. 3A, and the dot dashed lines 122 extending from the dashed lines in FIG. 6 correspond to the radii in FIG. 3A through with the spring forces act to counter various rotational movements caused by imbalance of the load on mixing frame assembly 38. Similarly, the dot dashed lines 123 in FIG. 5 illustrate radii through which springs 100 and 104 act, although lines 123 are not aligned with the x, y, z coordinate system. The springs may be connected through rollers 123 secured by an axle 124 through ears 126 integrally formed in members 94, 96 at one end of the springs, and through ears 128 welded to the top mix frame weldment 34 at the other end of the springs. When used, dampers may have threaded mounting rods 130 carried by ball joints 132 and secured with nuts (not shown) either to towers 92 or to upright members 94 and 96.

Figure 8:
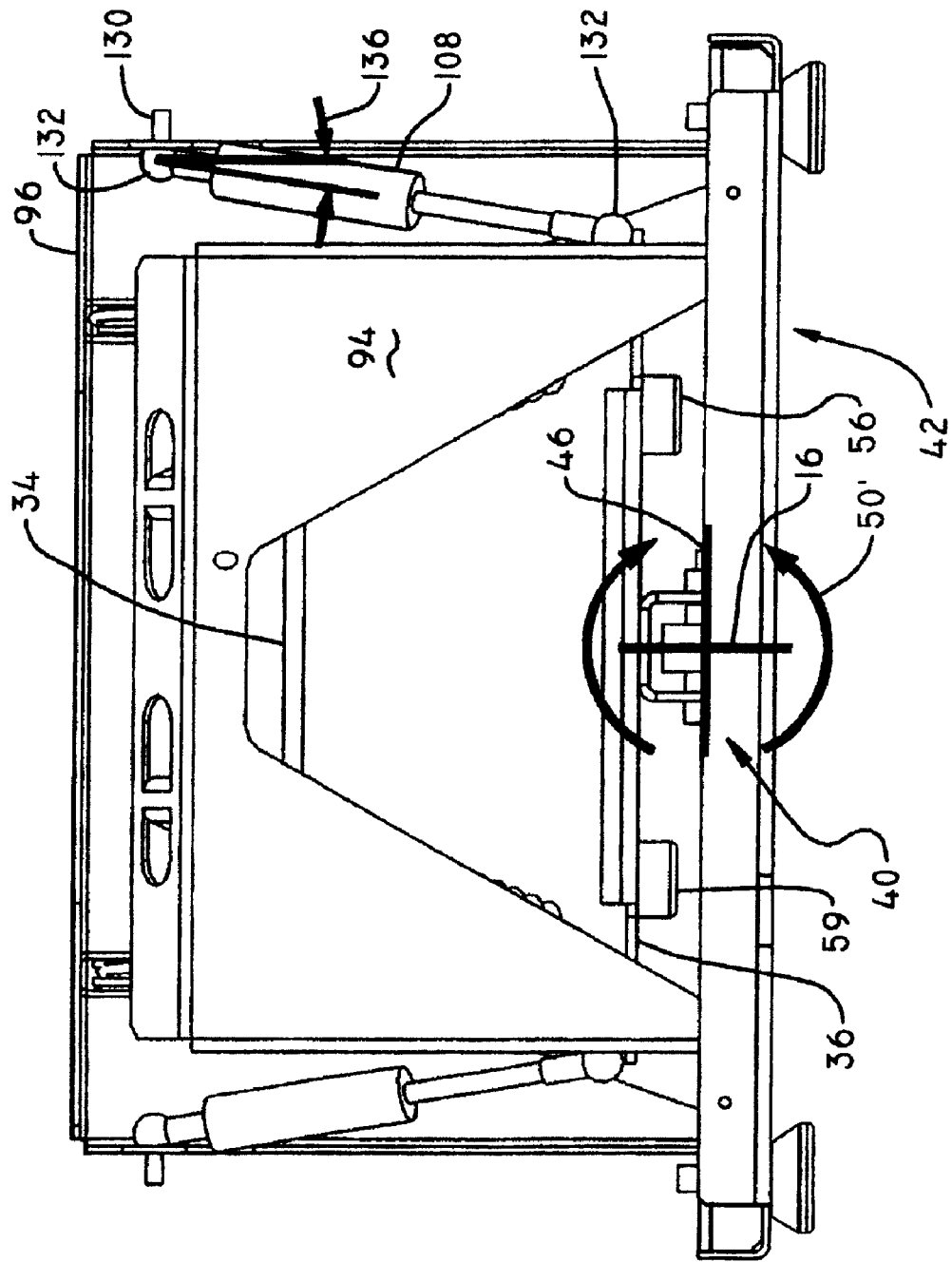
FIG. 8 is a front elevation view of the mixer parts shown in FIG. 5.
Figure 9:
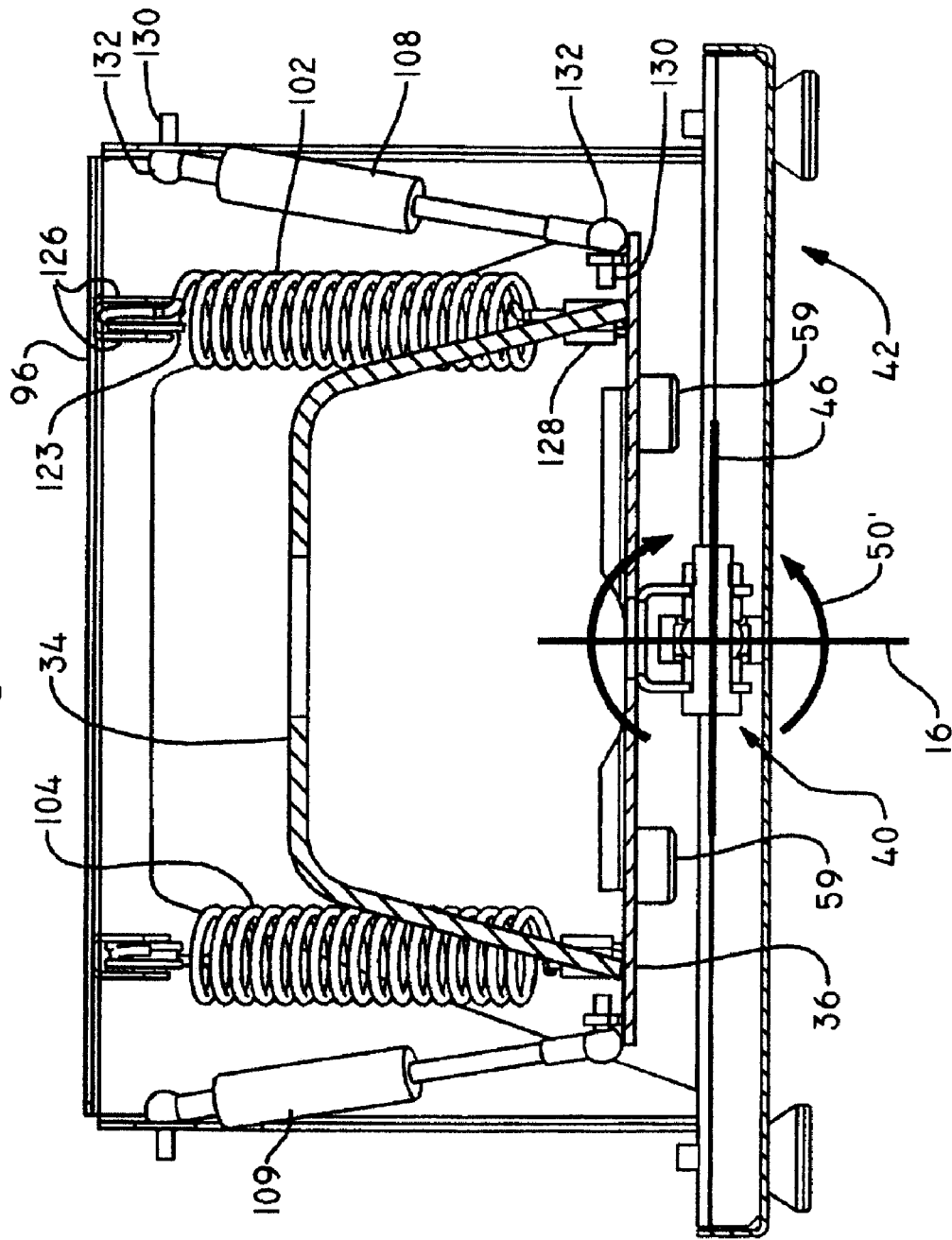
FIG. 9 is an elevation section view of the parts shown in FIG. 5, taken along line IX-IX of FIG. 5.
Figure 10:
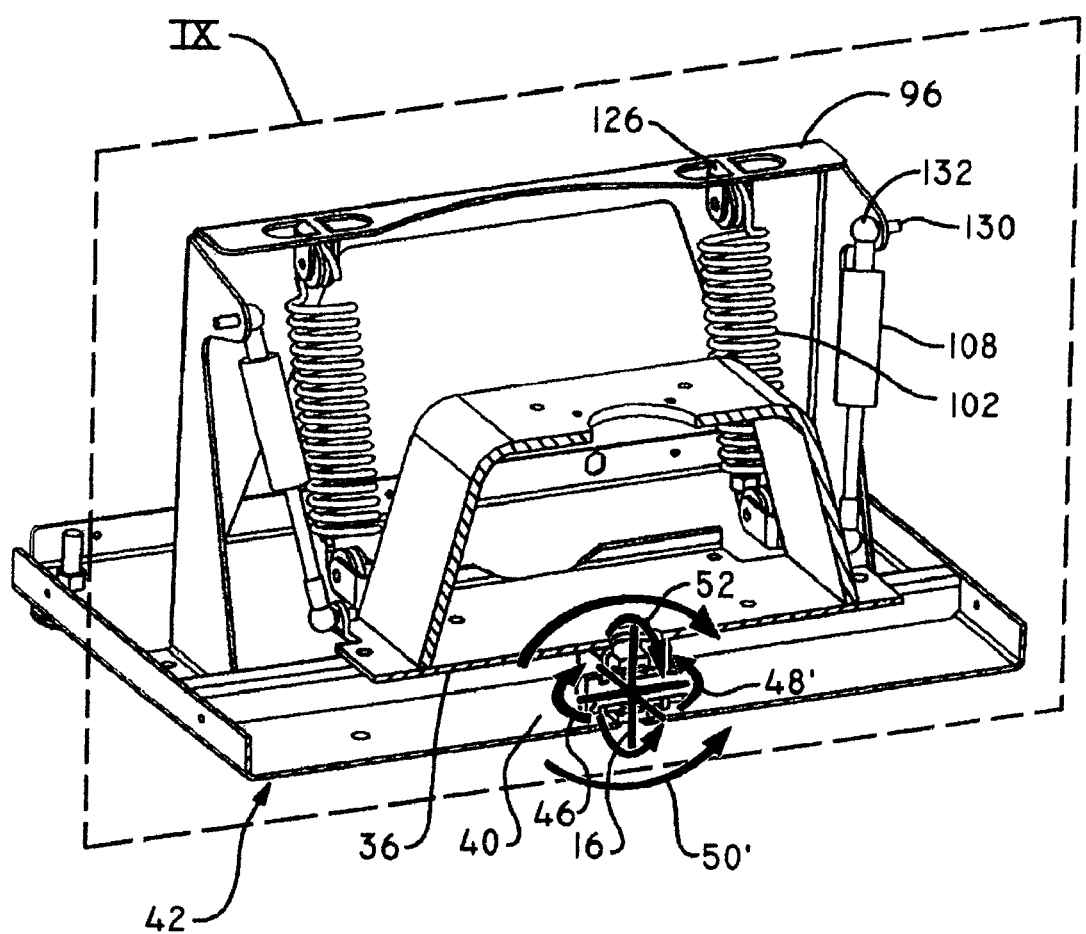
FIG. 10 is a perspective view of the parts shown in FIG. 9, along with the section plane IX.

Referring now to FIGS. 6 and 8-10, when desired, one or more dampers 108 may be used. Damper 108 is mounted at a three dimensional angle, as may be most clearly seen in FIGS. 6 and 8. Angle 134 is in the x-z plane of FIG. 6 and angle 136 in FIG. 8 is in the y-z plane, which is also the section plane in FIGS. 6, 8, 9 and 10. Because damper 108 (and its partner 109) are oriented primarily upright (or generally aligned with the z axis 47), primary damping will be for roll and pitch motions 50' and 52', with secondary damping (because of angles 134 and 136) of yaw motion 48'.

Figure 4:
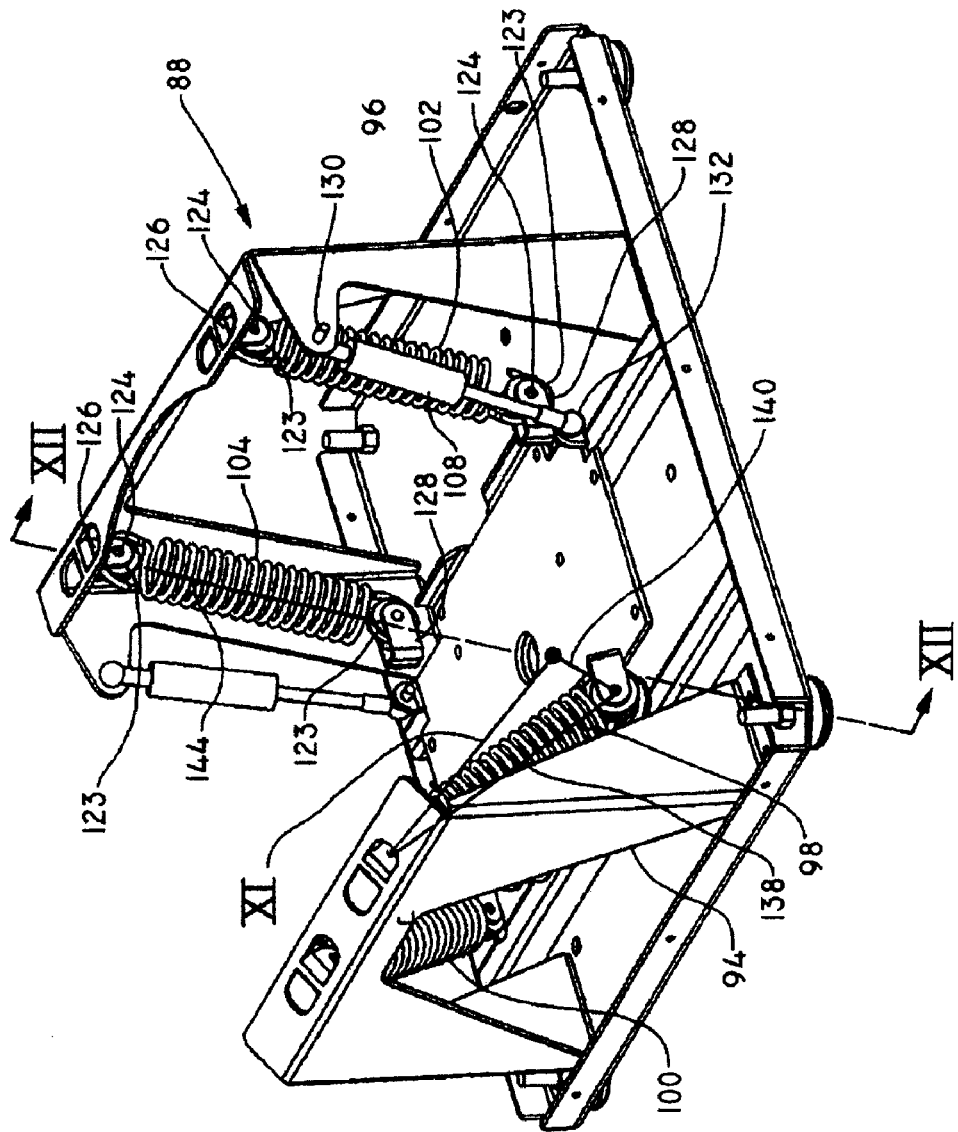
FIG. 4 is an alternative embodiment of the present invention with part removed to show certain details of the suspension system for a vortex mixer useful in the practice of the present invention.
Figure 11:
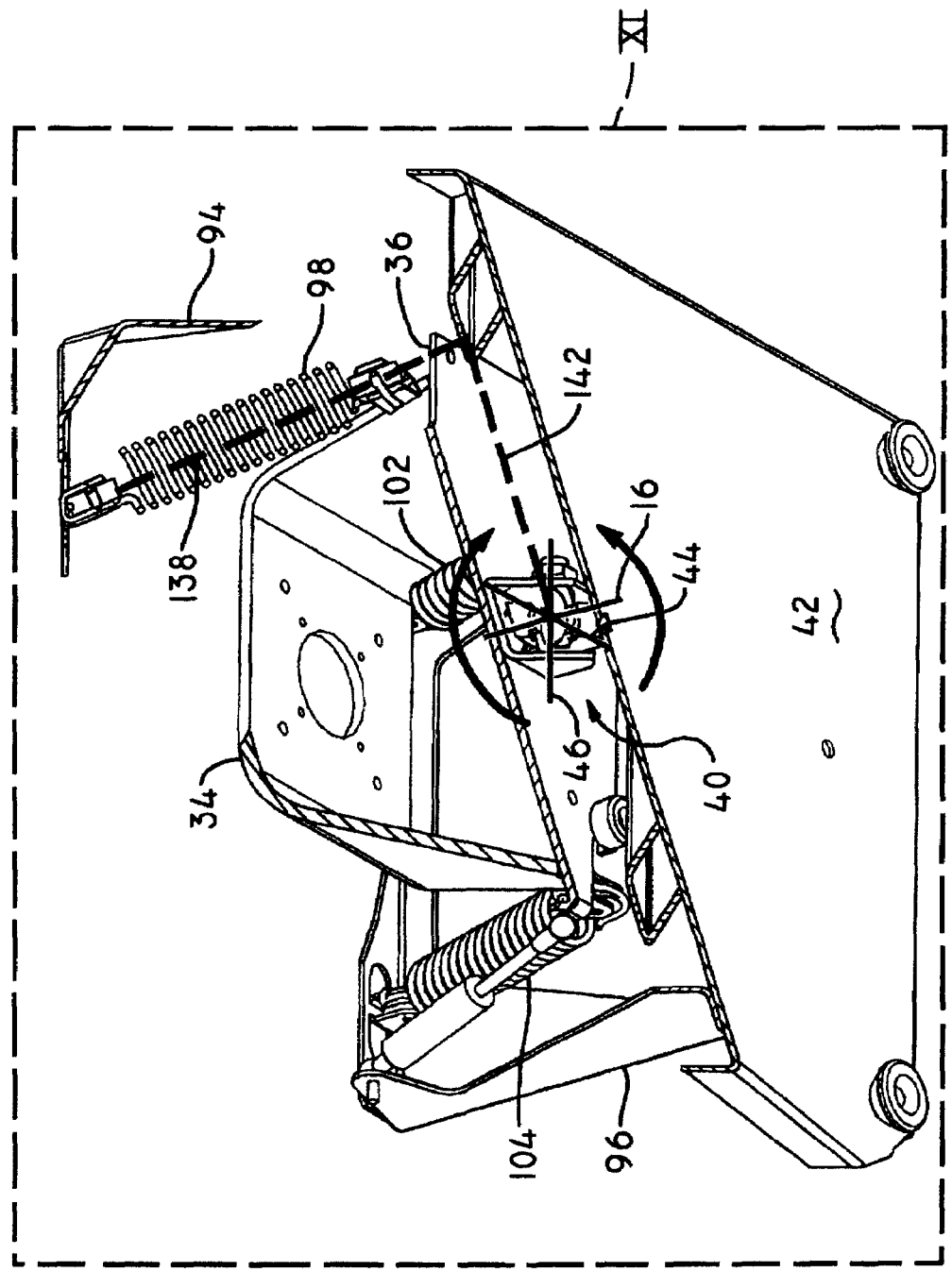
FIG. 11 is a perspective view of a section of parts shown in FIG. 5, taken along a section plane XI conforming to a plane of triangle XI in FIG. 4.

Referring now to FIG. 11 and also back to FIG. 4, a section XI through an axis 138 of spring 98 and a line 140 to the pivot may be seen in FIG. 11. The view shown in FIG. 11 is taken through the axis 138 of spring 98 and the center of the pivoting support 40. It is to be understood that line 140 in FIG. 4 is aligned with dot dashed line 142 in FIG. 11, when viewing perpendicular to the x-y plane. Line 142 corresponds to a radius or moment arm through which spring 98 acts on the mixing frame assembly 38.

Figure 12:
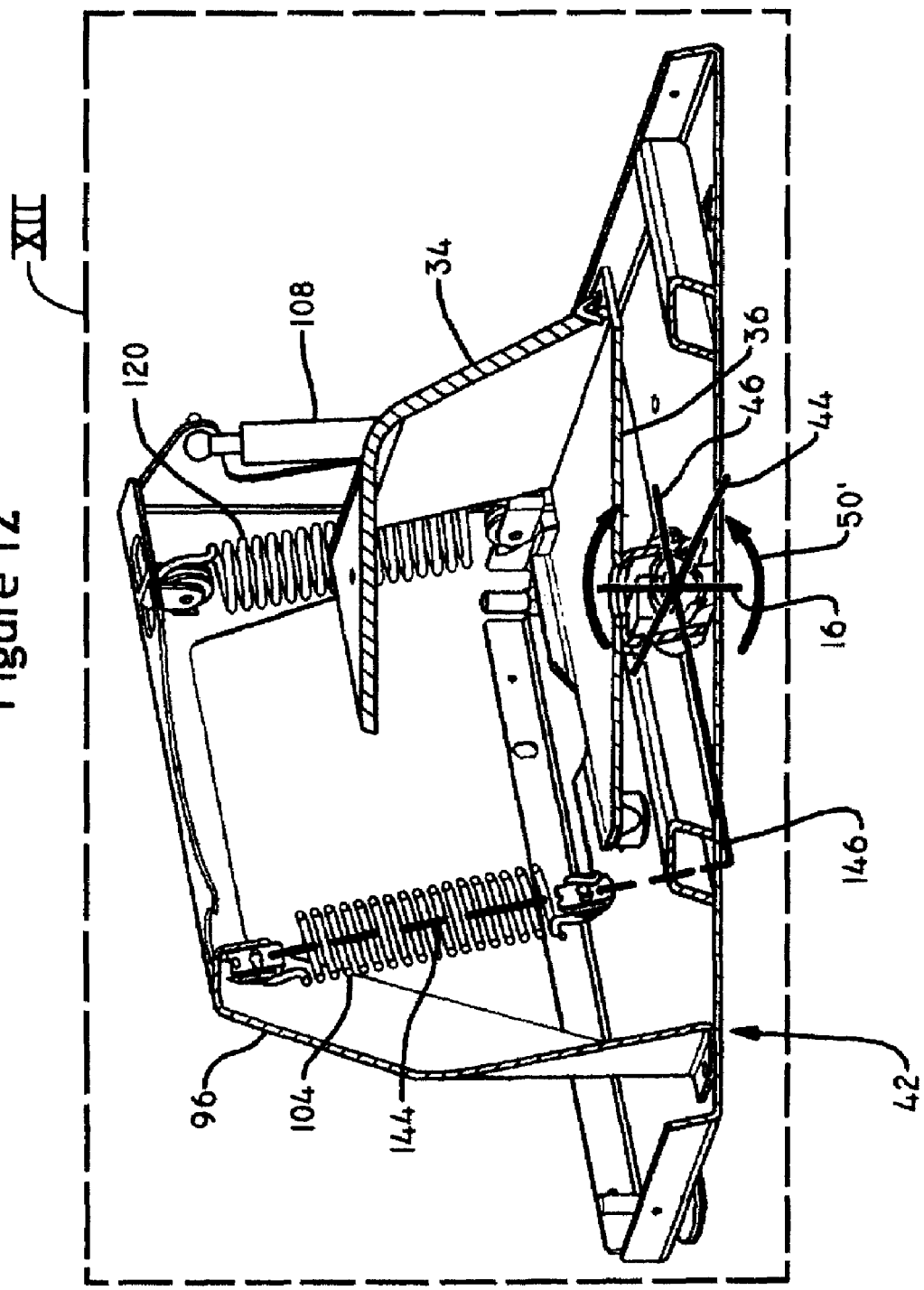
FIG. 12 is a perspective view of a section of parts shown in FIG. 5, taken along a section plane XII conforming to line XII-XII in FIG. 4.

Referring now to FIG. 12 and also back to FIG. 4, a section XII through line XII-XII may be seen in FIG. 12. The view shown in FIG. 12 is a section through an axis 144 of spring 104 and the center of pivoting support 40. It is to be understood that dot dashed line 146 corresponds to a radius or moment arm through which spring 104 acts on the mixing frame assembly 38.

One way of carrying out the design for the mixer is as follows. The mixing frame assembly (or pivotably mounted corresponding structure) is modeled using a dynamics analysis modeler computer program. One such program suitable for this purpose is Visual Nastran 4D, available from MSC-.Software, 500 Arguello Street, Suite 200, Redwood City, Calif. 94063.

The three rotational resonant modes are preferably matched to get the response to the forcing functions as clean as possible. Using equation (1) the springs are selected and oriented to achieve at least pitch and roll natural frequencies substantially below the lower of the spin and orbit forcing function frequencies corresponding to the spin and orbit rpms. For convenience, one pair of springs (e.g., the rear springs 102 and 104) may be oriented generally vertically in the y-z plane, and another pair of springs (e.g., the front springs 98 and 100) may be used to adjust yaw response by angling each spring of that pair out of the x-z plane. Desirably each fundamental or lowest natural frequency or resonant frequency in the x, y and z rotational directions is less than 0.707 times the lowest forcing frequency that can excite such resonant frequency or frequencies. The spring constant or spring rate and/or the effective radius to the pivot location are preferably adjusted to obtain the desired matching of resonant frequencies and frequency difference(s) from the closest forcing function frequency. Normally, this is carried out using an empty mixer, since that condition will result in the highest resonant rotational frequencies, with little or no change in the forcing function frequencies between empty and loaded mixer conditions. It will be found that an angle and radius may be selected to balance or match the three lowest rotational resonance frequencies. However, it may be found unnecessary or not desirable (for example, due to space considerations in the mixer) to exactly balance all three rotational resonance frequencies. Alternatively, it may not be necessary to match, for example, the yaw resonant frequency, if yaw motion at resonance is not significant.

It is to be understood that the first set or pair of springs may in the alternative or in addition be angled, as well, if desired. FIG. 5 illustrates this option for the present invention at dashed line 106.

To address the roll motion, one may, for convenience, hold the spring constant fixed and adjust the working radius and angle of the spring to get an effective spring rate (i.e., corresponding to a spring perpendicular or orthogonal to the working radius) while remaining within the physical constraints of the mixer environment. With the arrangement shown, it is to be understood that moving springs laterally apart will increase the roll natural frequency, with all other parameters held constant, because of an increase in the effective radius.

Similarly, moving springs apart along the roll axis 44 will result in a higher pitch rotational resonance, since the effective moment arm or radius will increase, assuming all other parameter are held constant.

Starting with a vertical spring orientation and angling the spring from the vertical will increase the effect on yaw, while reducing the effect on one or both of roll and pitch (depending upon the direction of angling). In the design shown, the two front springs 98 and 100 have been angled to increase effect on yaw motion.

Adding dampers to the system is analogous to the design effort carried out for the springs. Orienting the dampers vertically results in no yaw damping, while angling the dampers will increase yaw damping, while reducing damping in one or both of the roll and pitch rotational directions. It has been found satisfactory to use only two dampers, angled to achieve sufficient damping in all three rotational directions. Alternatively, an annular damper element, described infra, has been found desirable for the practice of the present invention.

Figure 13:
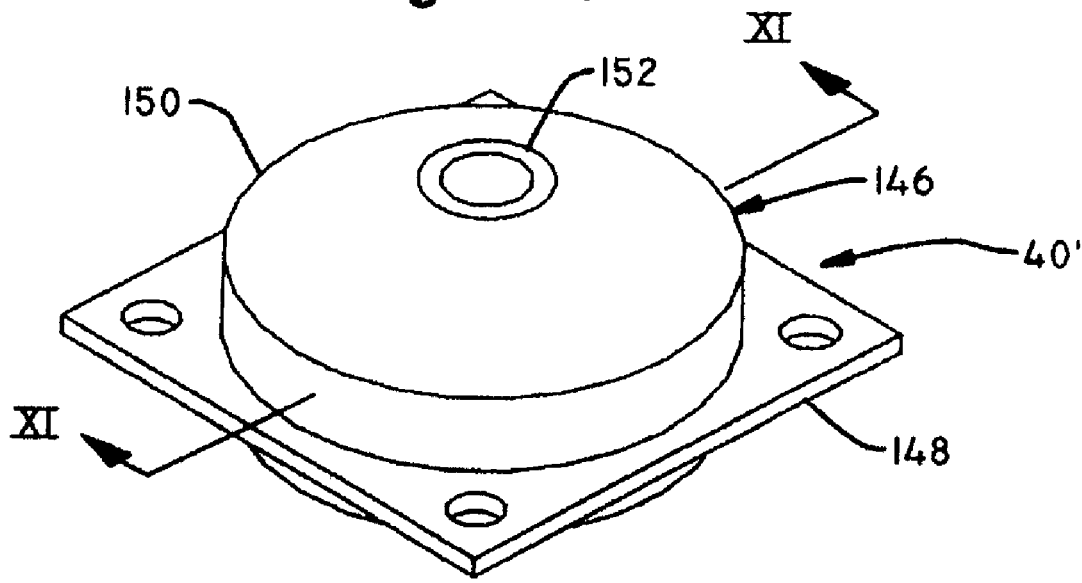
FIG. 13 is a perspective view of an alternative embodiment for a pivoting support using an elastomeric isolator in the practice of the present invention.
Figure 14:
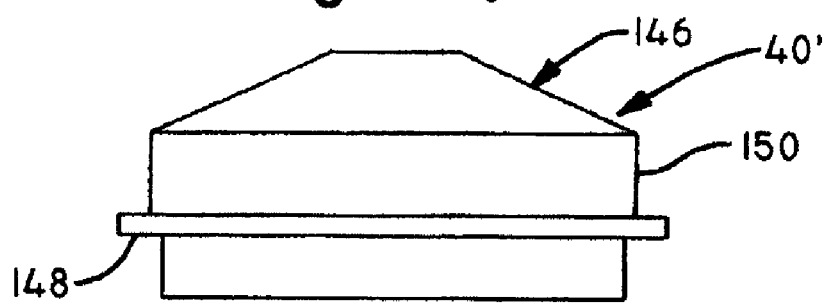
FIG. 14 is a side view of the pivoting support of FIG. 13.
Figure 15:
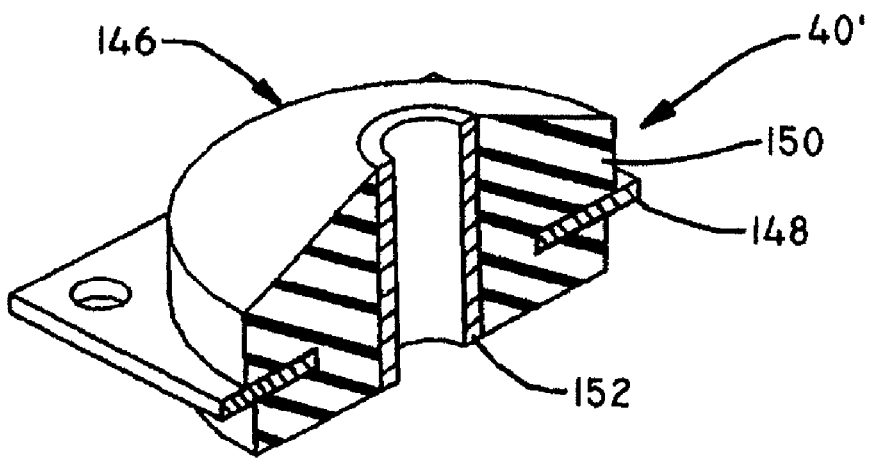
FIG. 15 is a section view in perspective of the pivoting support taken along line XV-XV of FIG. 13.

Referring now to FIGS. 13, 14, and 15, an alternative embodiment 40' for the pivoting support 40 may be seen. This embodiment of a pivoting support 40' may utilize an isolator 146 which is commercially available. In this embodiment, the elastomeric shock mount isolator 146 has a steel mounting plate 148 embedded within an elastomeric body 150, made of, for example, synthetic or natural rubber. Preferably a rigid tube 152, which may also be made of steel, is molded in body 150. In use, one of the plate and tube 148, 152 is secured to the base 42 and the other of the plate and tube 148, 152 is secured to the mixing frame assembly 38, preferably at the bottom mix frame weldment 36.

As mentioned above, it is within the practice of the present invention to have a pivoting support which does not permit yaw motion. Furthermore, it is also within the scope of the present invention to have a pivoting support which has offset pivot points or locations for the respective rotational axes, in which case, the effective radii will be with respect to different planes containing the respective pivot point addressed.

Figure 16:
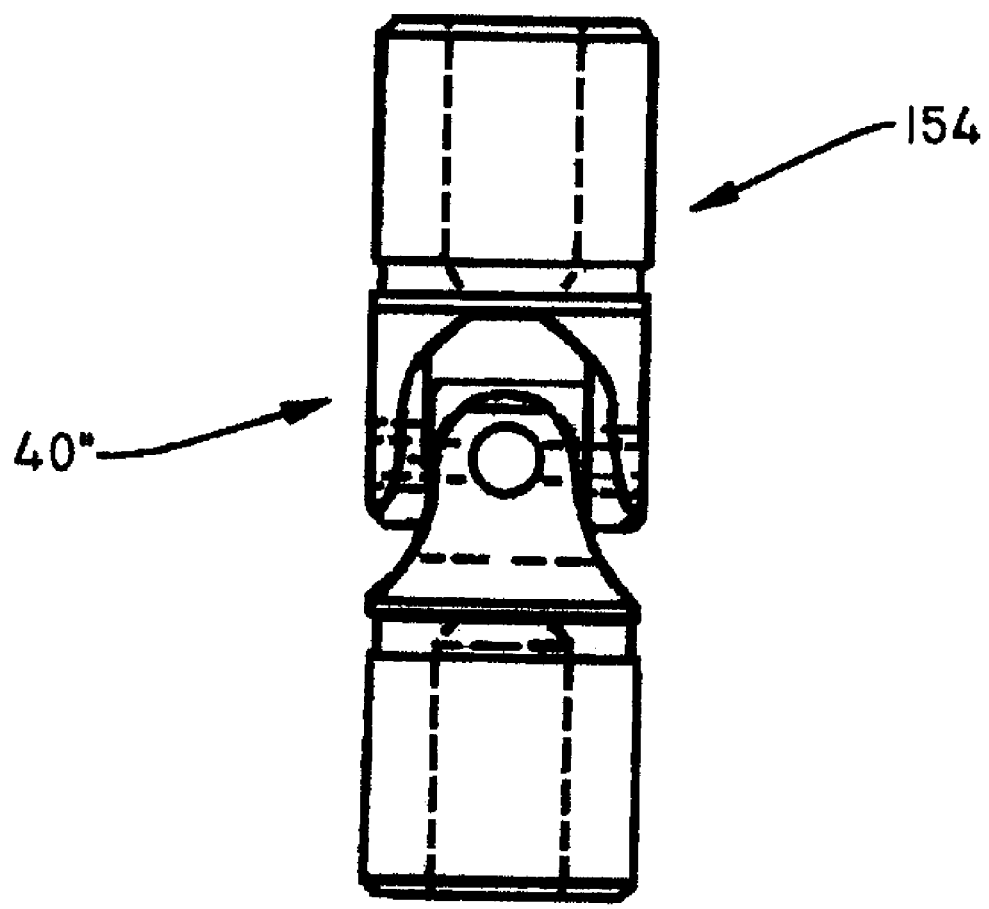
FIG. 16 is a side elevation view of another alternative embodiment for a pivoting support using a U-joint in the practice of the present invention.
Figure 17:
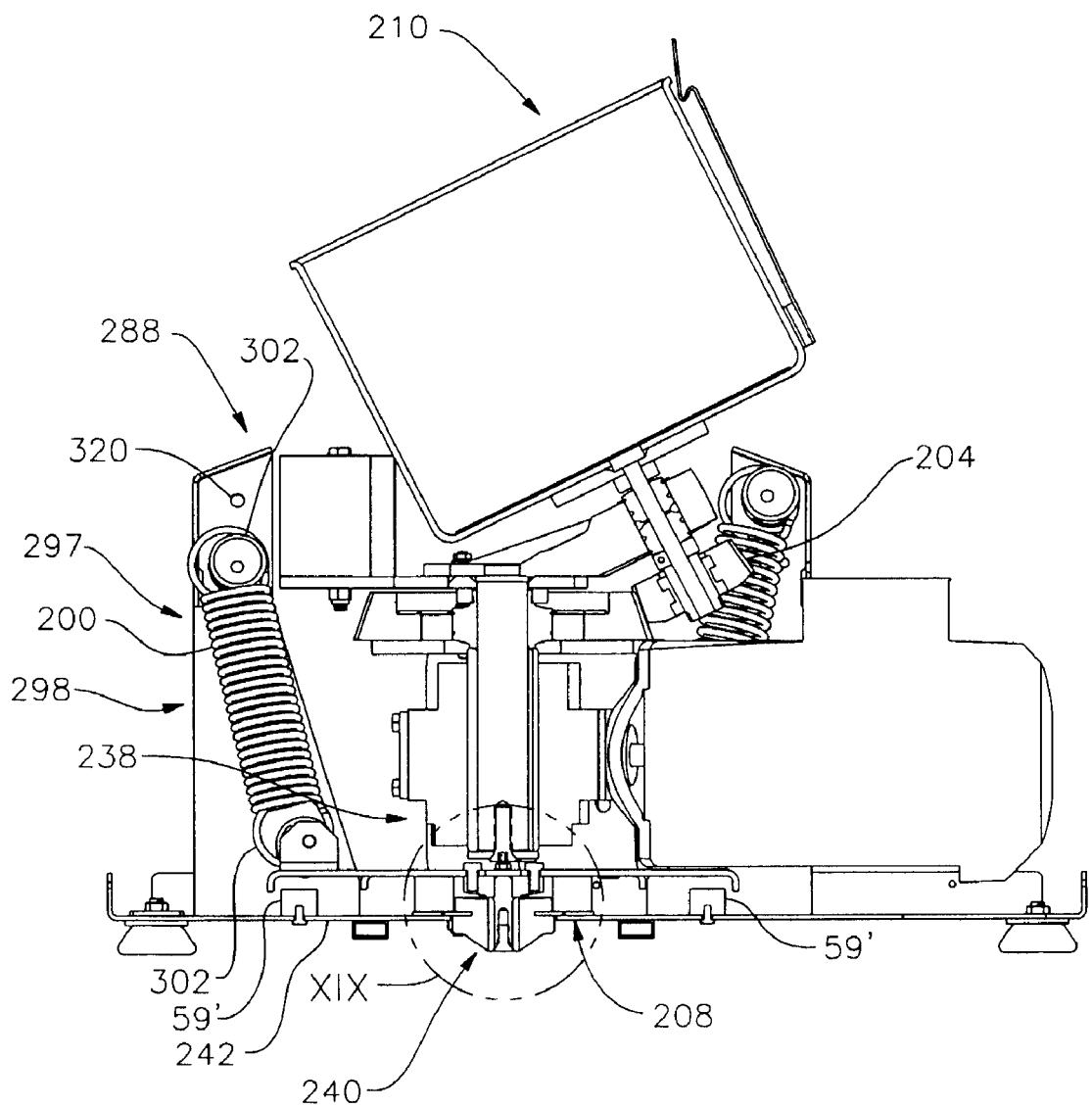
FIG. 17 is a section view of an alternative embodiment of a mixer (without a cover) useful in the practice of the present invention.

One still further alternative embodiment 40" of the pivoting support 40 is shown in FIG. 16 as a conventional U-joint 154. In use, U-joint 154 is connected between the base 42 and the mixing frame assembly 38, preferably at the bottom mix frame weldment 36.

Figure 19:
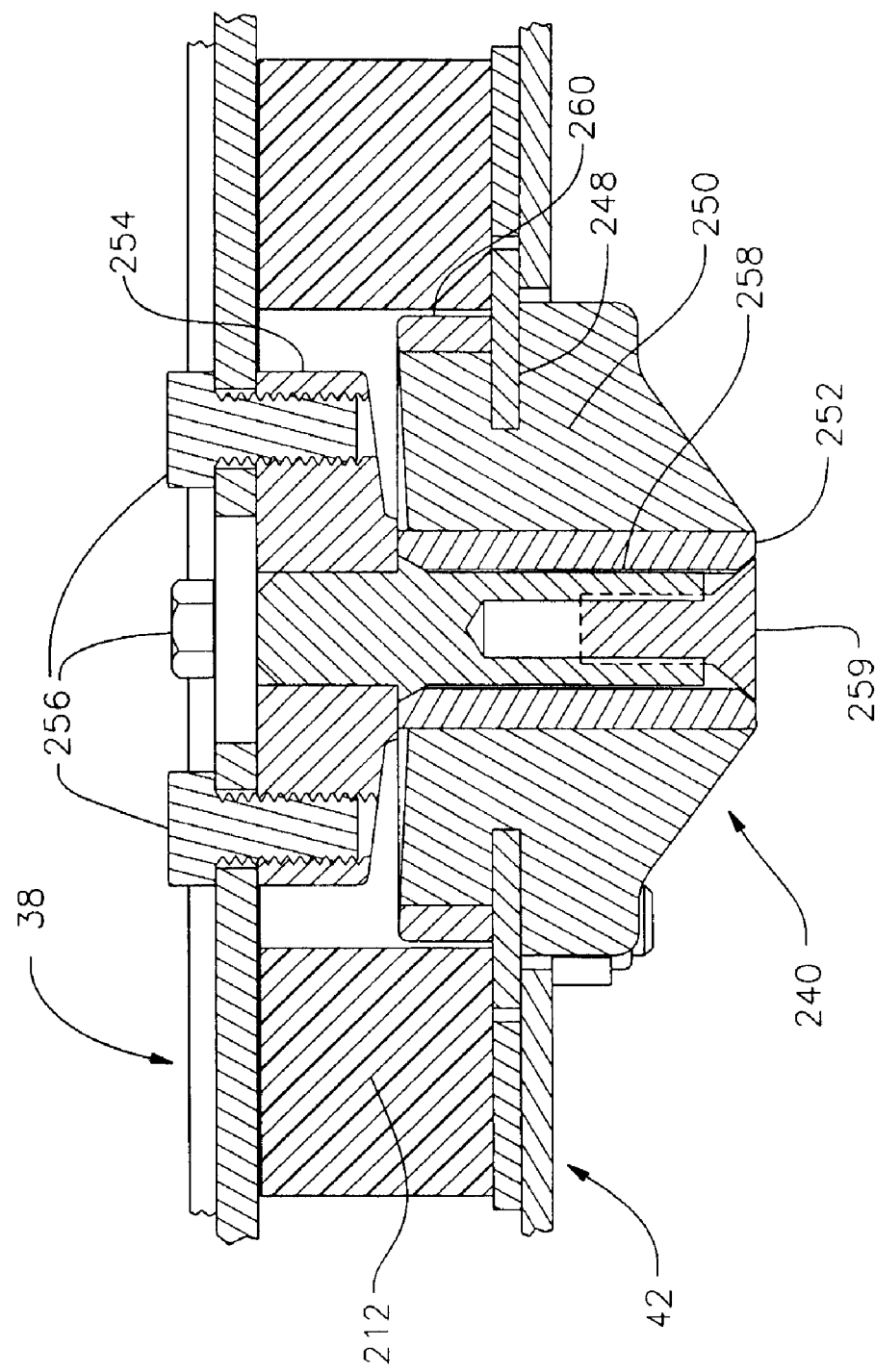
FIG. 19 is an enlarged and simplified view of detail XIX of FIG. 17.
Figure 20:
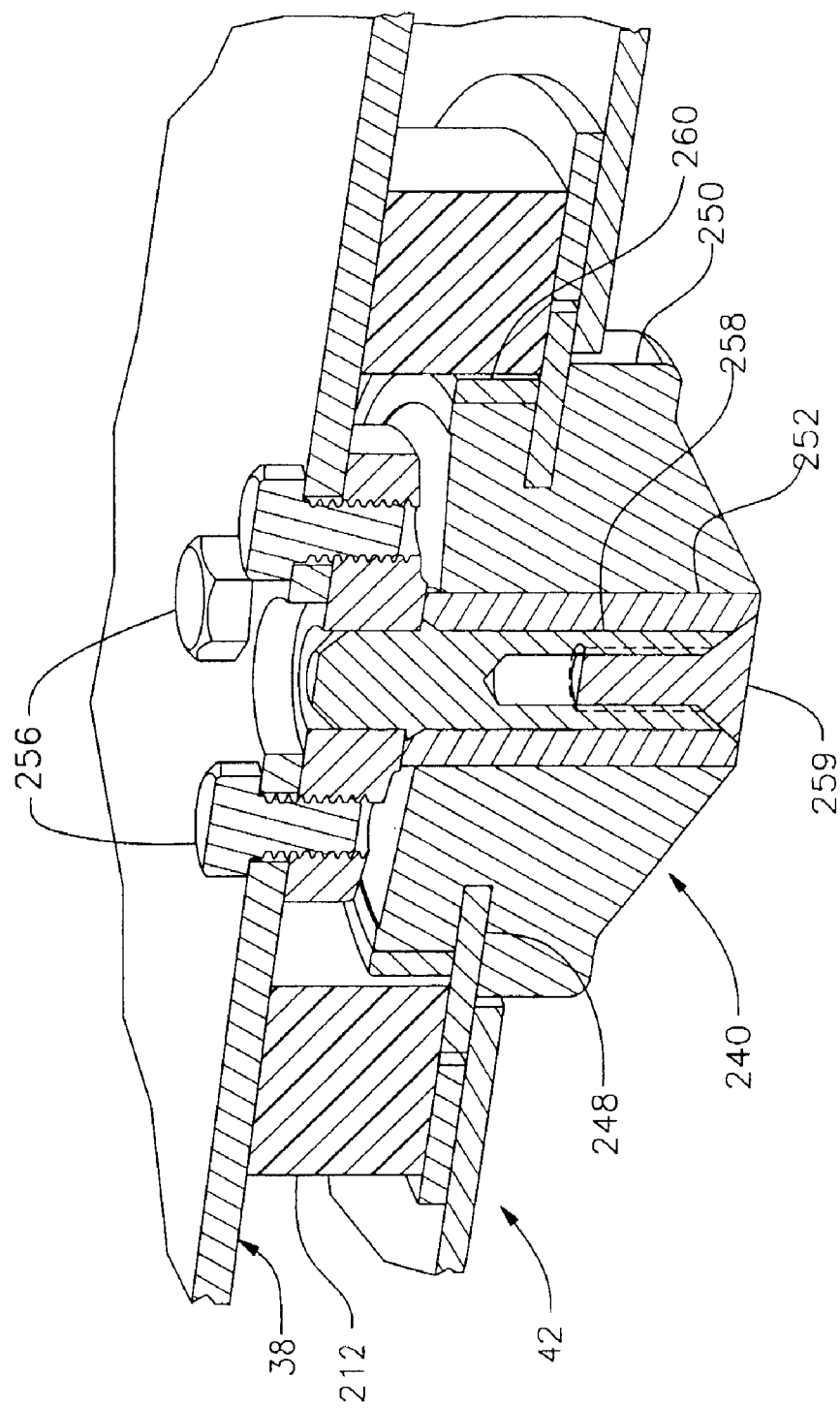
FIG. 20 is a perspective section view similar to that of FIG. 19.
Figure 22:
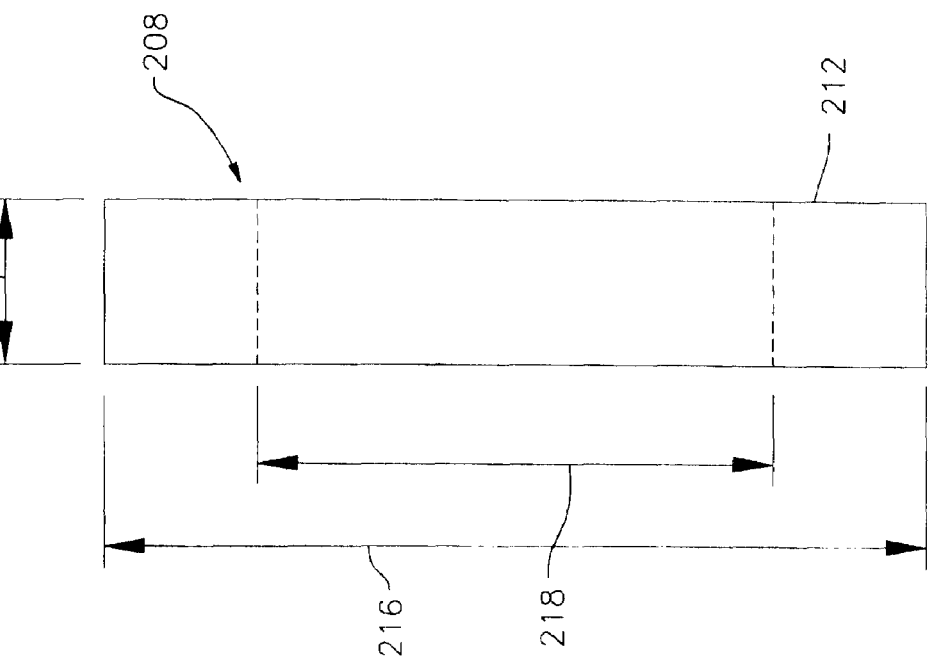
FIG. 22 is a side view of the damper of FIG. 21.
Figure 21:
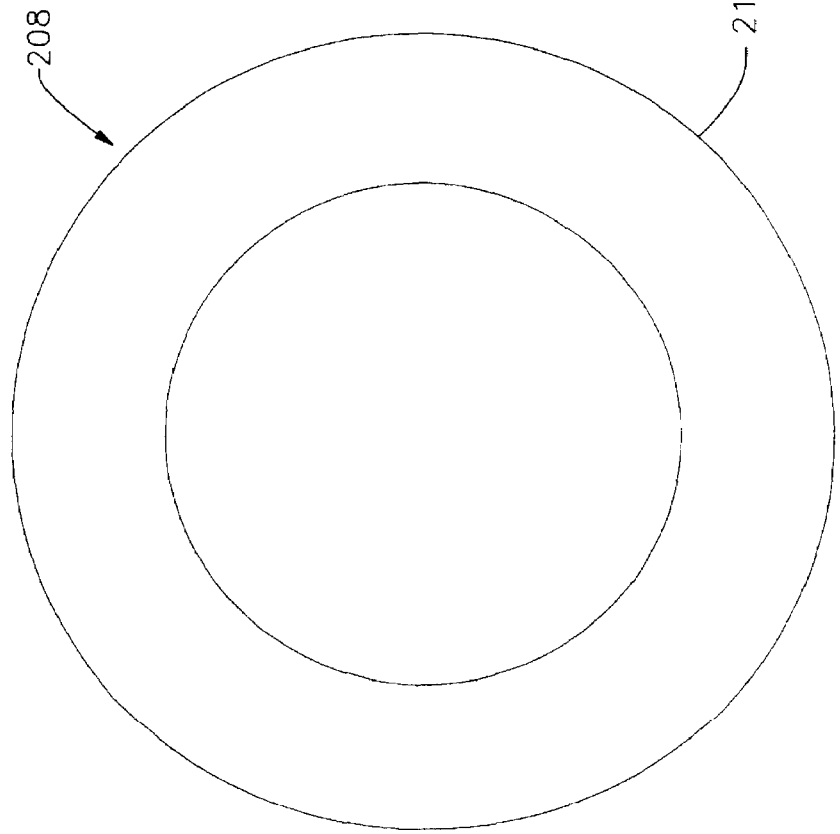
FIG. 21 is a plan view of a damper useful in the practice of the present invention.
Figure 31:
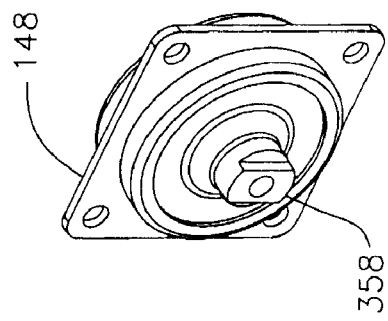
FIG. 31 is a perspective view of one side of the pivoting support of FIG. 29.
Figure 30:
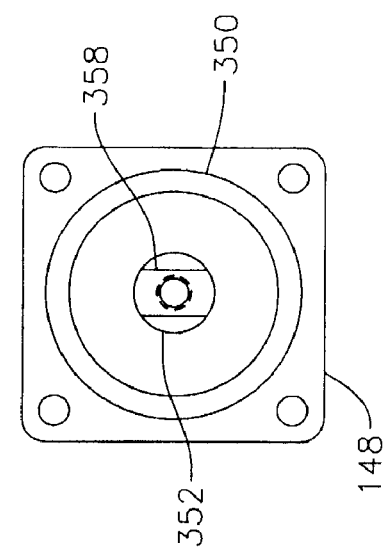
FIG. 30 is a plan view of one side of the pivoting support of FIG. 29.
Figure 29:
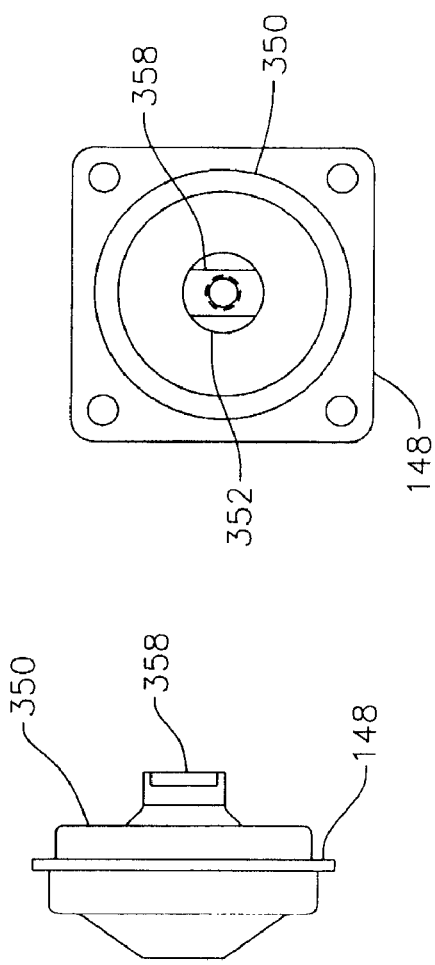
FIG. 29 is a side view of an alternate pivoting support.
Figure 34:
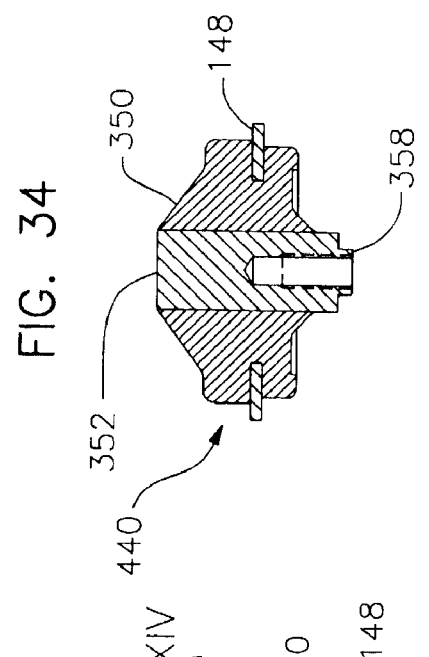
FIG. 34 is a section view taken along line XXXIV-XXXIV of FIG. 33.
Figure 33:
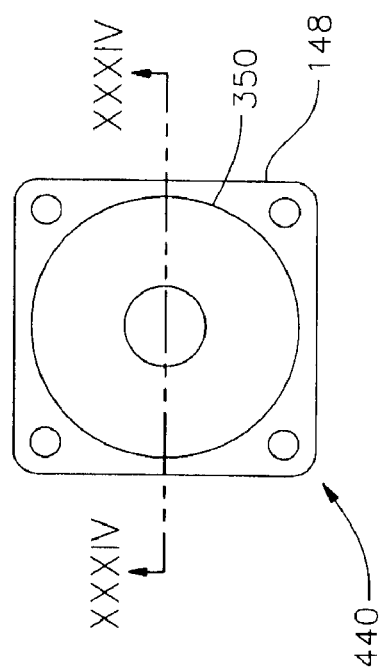
FIG. 33 is a plan view of the other side of the pivoting support of FIG. 29.
Figure 32:
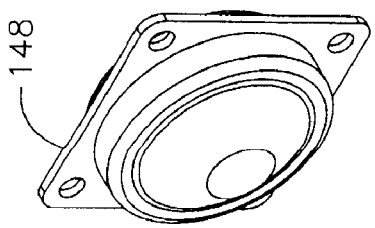
FIG. 32 is a perspective view of the other side of the pivoting support of FIG. 29.

Referring now to FIGS. 17-40, and most particularly to FIGS. 17-22, an alternative embodiment 210 of the mixer 10 may be seen. Like mixer 10, mixer 210 has a suspension system 288 utilizing a pivoting support 240 and a plurality of springs 298, and generally operates in the same way and according to generally the same principles as described for mixer 10. Mixer 210 has a damper 208 preferably in the form of an annular member or ring 212 formed of commercially available viscoelastic polymer material. In the practice of the present invention, it has been found desirable to use a ring having a 70 durometer (shore 00) but it is to be understood that other geometries and durometers may be used in the practice of the present invention for damper element 208. Furthermore, various shapes for one or more dampers or damper elements may be used, although, as is illustrated in FIGS. 21 and 22, a ring having dimensions of 1.00 inches thickness, 5.00 inches OD, and 2.81 inches ID has been found preferable for use herein.

While it is preferable to have the damper element 208 extend substantially completely around the pivot 240, an alternative within the present invention is to have a damper element extending only partially around the pivot. A still further alternative within the present invention is to have at least one and preferably a plurality of damper elements located at one or more predetermined distances (or, equivalently, at a predetermined effective radius) from the pivot. In all embodiments or alternatives, the damper element is located between a mixing frame assembly 238 and a base 242 of the mixer 210. The damper element 208 acts as an energy absorber when the mixing frame assembly 238 pivots with respect to the base 242 and deforms the damper element 208. The damper element or elements may be arranged anywhere between the mixing frame assembly and the base, while still remaining within the scope of the present invention. Preferably, the mixing frame assembly has a generally planar support member 236 and the base 242 is also generally planar, in which case the damper element is preferably located between the generally planar support member 236 and the base 242.

It has also been found preferable to provide a predetermined preload for the damper element, to obtain more effective or efficient use of the viscoelastic material forming the damper element. It is also to be recognized that the viscoelastic material of the damper element will act as a spring in addition to acting as an energy absorber, and the spring effect of viscoelastic material must be taken into account in the design and construction of the suspension system of the present invention. In one embodiment of the present invention with a mixing frame assembly having a weight of approximately 100 pounds (without a paint container), a total preload of about 350 pounds on the damper element has been found desirable, resulting in sufficient deformation (which may, but need not be in the form of compression) of the damper element to achieve the desired spring action. It is to be understood to be within the scope of the present invention to have deformation of the damper element other than compression, such as tension or shear or a combination thereof. However, in a preferred embodiment, the preload is achieved by applying a compressive load across the pivoting support 240. In another aspect, the predetermined preload may be chosen (additionally or alternatively) to be an amount sufficient to provide a substantial degree of leveling for the mixing frame assembly when it is at rest.

FIGS. 19 and 20 show one form of pivoting support 240. Other variations for the pivoting support 240 may be seen in FIGS. 23-39. In the embodiment shown in FIG. 19, the pivoting support 240 is located between the mixing frame assembly 38 and the base 42. A first metal mounting structure or first flange 248 is located peripherally of an elastomer element 250. A second metal mounting structure 252 is located centrally of the elastomer element 250, with the first and second metal mounting structures preferably bonded to the elastomer element. An insert 258 is received in structure 252 and secured therein by a machine screw 259. Insert 258 is secured to a flange 254 by welding. Flange 254 is mounted to the mixing frame assembly 38 by three bolts 256. A spacer ring 260 may be used to locate the damper ring 212 in a concentric relationship to the pivoting support 240.

It is to be understood, however, that other arrangements may be used to locate the damper element at a predetermined radius from the pivot, for example, and not by way of limitation, either (or both) the damper element or pivot may be resized to closely interfit with each other, without the need for the spacer ring 260, keeping in mind that resizing the damper element will affect the damping and spring properties thereof.

Referring now most particularly to FIGS. 23-28, an alternative pivoting support 340 may be seen. Support 340 is similar to support 240 (corresponding to support 40' shown in FIGS. 13-15), except that support 340 has a round periphery for flange 348 where supports 40' and 240 each have a generally square periphery for plates 148 and 248. In addition, support 340 preferably has a keyed surface 358 on a cylindrical rod or extension 352 passing through an elastomer body 350, it being understood that both flange 348 and rod 352 are permanently bonded to elastomer body 350. Support 340 may have apertures 354 in flange 348 or alternatively apertures 354 may be replaced by threaded studs 356.

Referring now most particularly to FIGS. 29-34, a further alternative pivoting support 440 may be seen. Support 440 has the square periphery plate or flange 148 bonded to elastomer element 350 which in turn is bonded to rod 352 having keyed surface 358 thereon.

Referring now most particularly to FIGS. 35-39, a still further alternative pivoting support 540 may be seen. Support 540 is similar to the supports described above in that it has the generally square peripheral flange 148 as a first metal mounting structure bonded to an elastomer body 550 which is also bonded to a second metal mounting structure 552 in the form of a rod or tube with a second flange 554 integral therewith, the second flange having apertures 556 therein. The apertures in flange 554 serve as an indexing structure formed integrally with the second metal mounting structure to positively orient the base and mixing frame assembly with respect to each other. It is to be understood that the indexing structure preferably orients the mixing frame assembly to the base in the xy plane, i.e., a plane perpendicular to the z axis.

Figure 18:
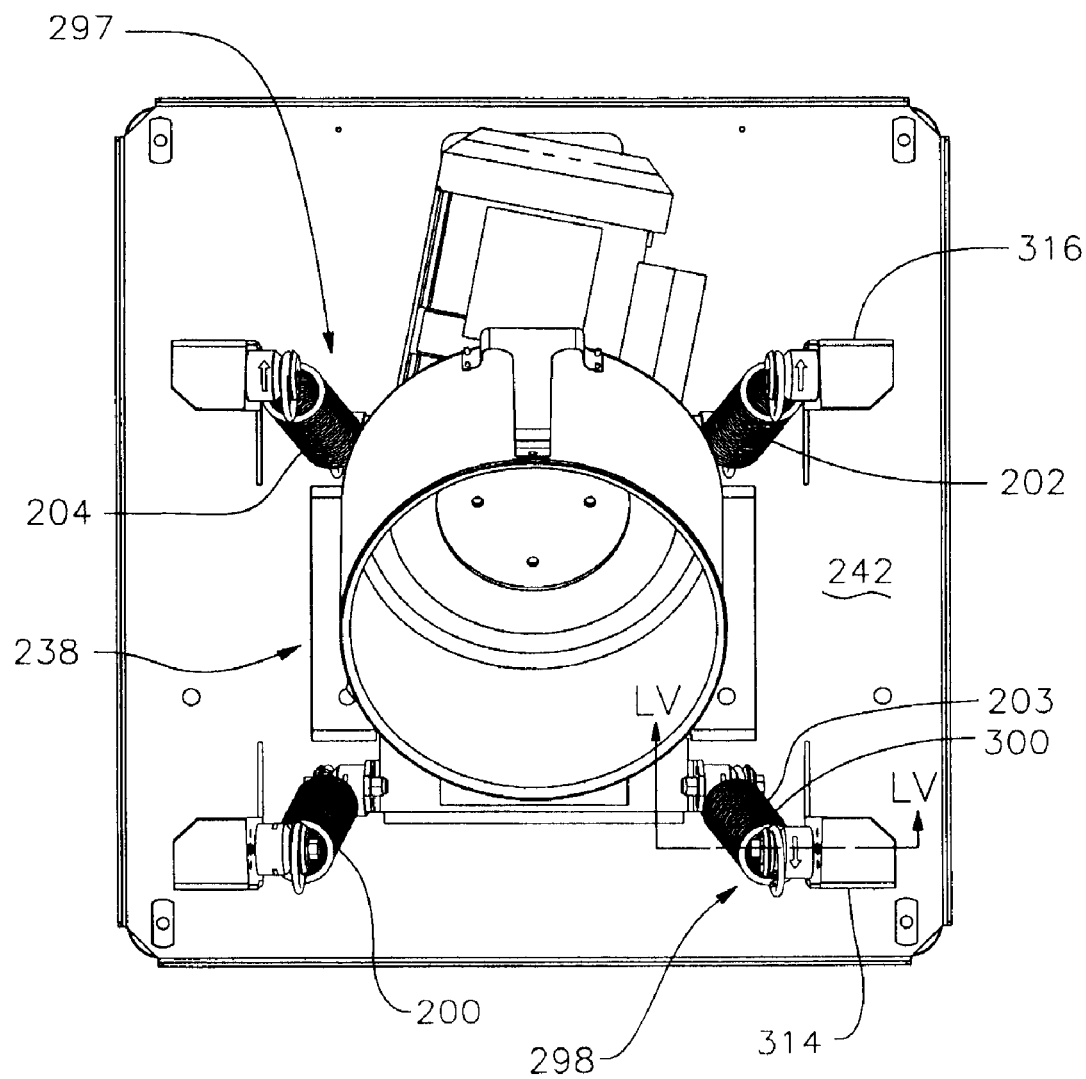
FIG. 18 is a top view of the mixer of FIG. 17.
Figure 40:
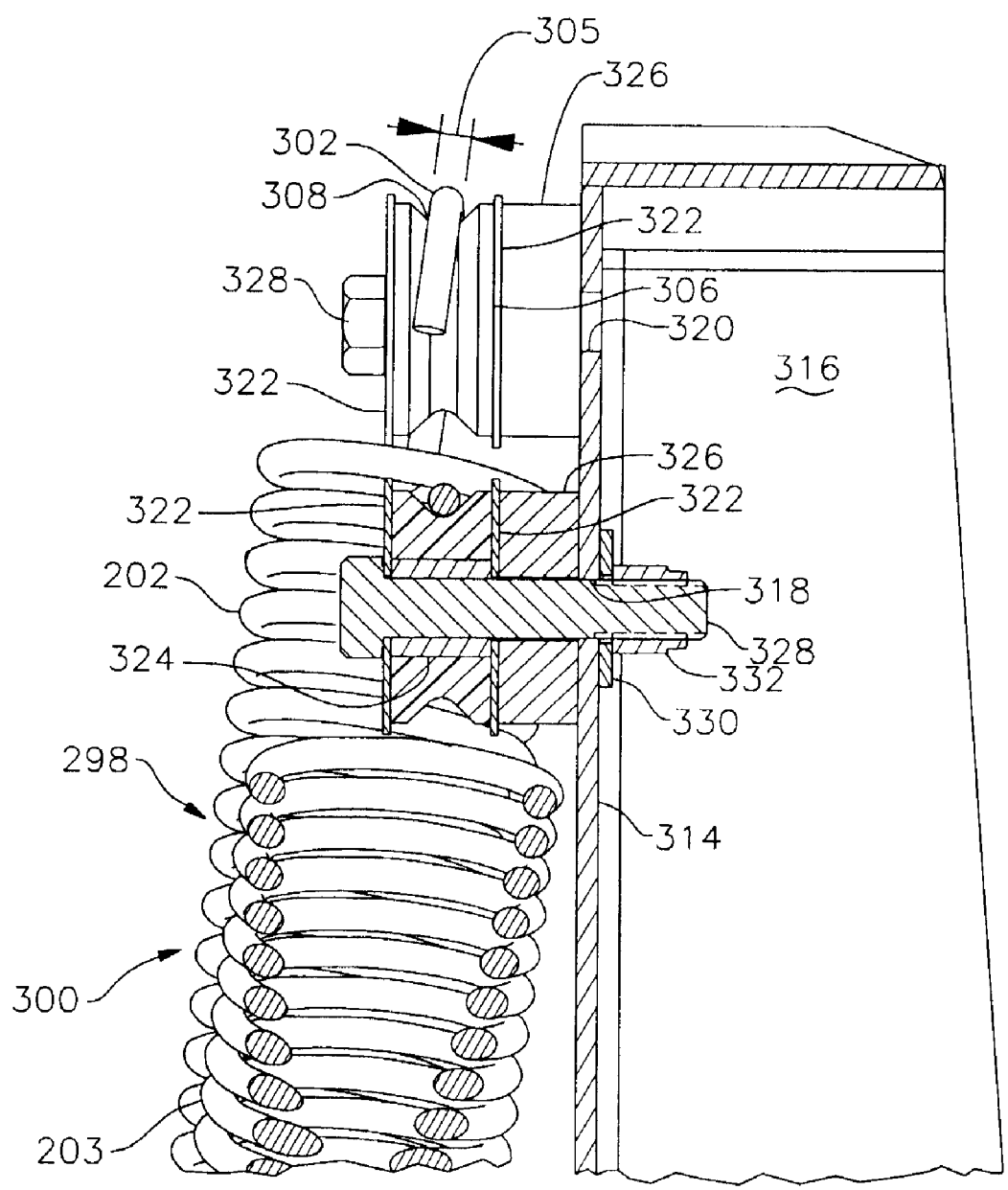
FIG. 40 is a detail section view taken along line XL-XL of FIG. 18.

Referring now to FIGS. 17, 18 and 40-43, another aspect of the improved suspension of the present invention may be seen. In this aspect, the mixer 210 has one or more (preferably four) helical extension springs 298 connected between the mixing frame assembly 238 and the base 242. FIG. 40 is a view, partly in section along line 40-40 of FIG. 18 showing the arrangement for springs 203 and 202, although it is to be understood that the same arrangement described infra may and preferably is used for springs 200 and 204. Each spring is preferably formed as a helix 300, with each end of the spring having an end turn 302 formed from the helix 300, which itself is generally cylindrical (see FIGS. 17, 18 and 40). In the process of forming end turns, it is not easy to maintain parallelism of the end turns at opposite ends of the spring. Furthermore, each end turn 302 is a portion of the helix 300 and thus has a spiral shape itself. Finally, in one variation (shown in FIG. 40), a primary axis 301 of the spring 298 (more particularly, the cylindrical axis of the helix 300) may not be perpendicular to a mounting axis 307 of a bushing 306 to which the spring is mounted, exacerbating the challenge of aligning the spring and its mounting bushing. Nevertheless, this aspect of the present invention is still useful even when the primary axis of the spring is perpendicular to the cylindrical axis of the bushing, as shown and described infra, with respect to FIG. 55.

In attaching end turns 302 of springs in the assembly of the mixer suitable for the present invention, it has been found that a circumferential U-shaped groove closely matching the wire diameter 304 of the spring allows the end turn to jump out of the groove when tension is relieved on the spring, as may happen as a result, e.g., of shock loading, in shipping, handling or even operating the mixer. Even partial unmounting of one or more end turns has been found undesirable. Accordingly it has been found advantageous to provide the bushing 306 with a circumferential V-groove 308 formed therein to receive end turn 302. The V-groove 308 desirably has an included angle 310 sufficiently large enough to permit some misalignment of the end turn in the V-groove when the end turn of the spring is received in the bushing. Preferably the included angle 310 is about 90 degrees. It is to be understood that the wire forming the end turn typically will have a characteristic wire diameter and the V-groove preferably will have an entry dimension or width 305 at the top of the V-groove substantially greater than the wire diameter 304 of the end turn received in the V-groove.

The V-groove 308 may have a contoured surface 312 replacing the vertex of the included angle 310, with the contoured surface 312 preferably in the form of an arc with a radius equal to half the diameter 304. Providing the bushing 306 with the V-groove 310 guides the end turn 302 back into engagement with the bushing in the event that tension is relieved on the spring, so that the chances of complete disengagement of the spring from the spring mount or misalignment of the end turn in contact with the bushing are reduced.

Figure 43:
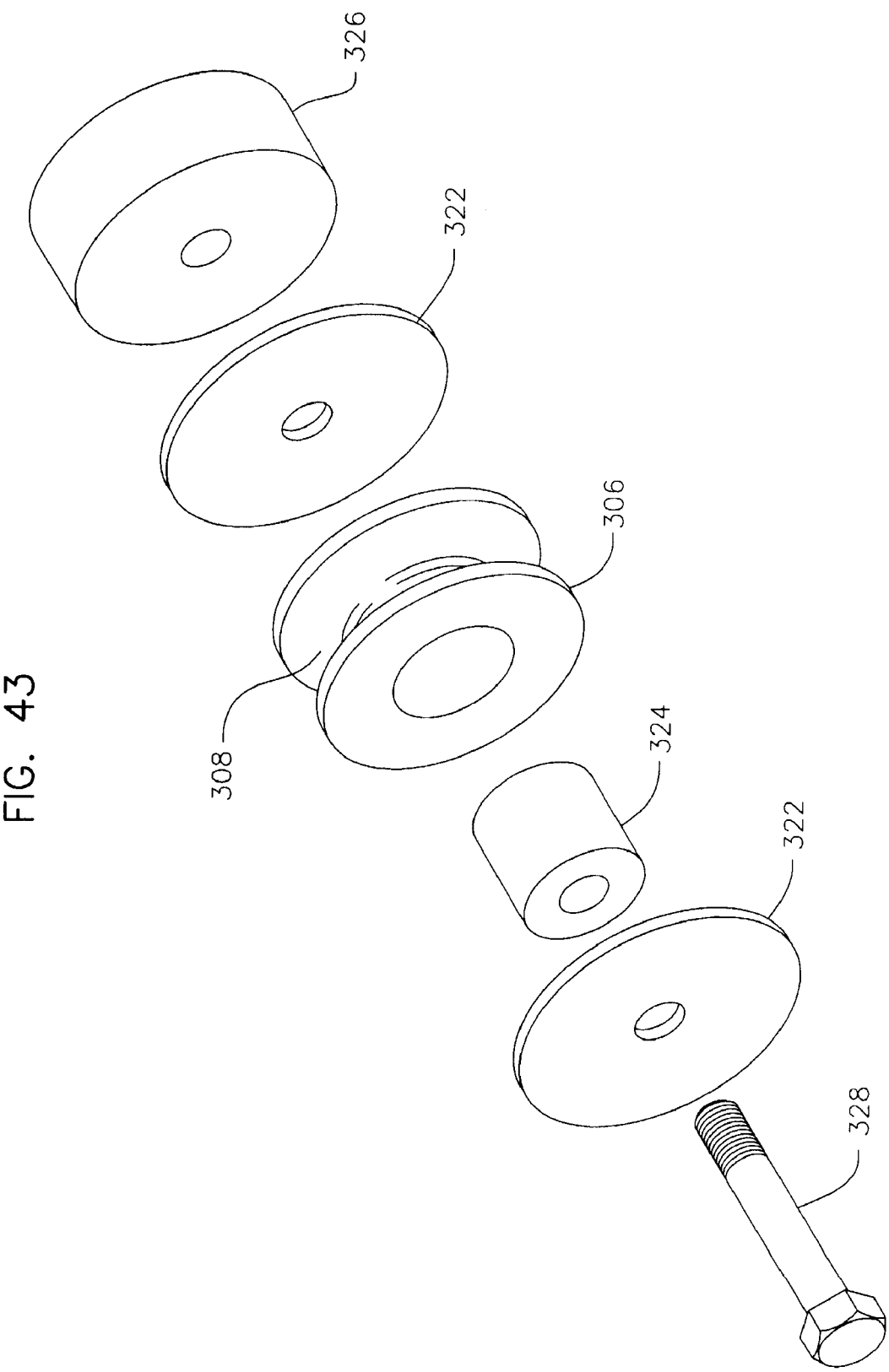
FIG. 43 is an exploded view of a spring attachment ring and associated parts from FIG. 40.

Referring now most particularly to FIGS. 40 and 43, various details of the spring mounting arrangement of the suspension of the present invention (which includes the improved bushing 306) may be seen. In the suspension of the present invention, each spring is mounted between the mixing frame assembly 238 and a respective spring tower, with tower 314 for spring 203 shown in section and tower 316 for spring 202 shown partially obscured in FIG. 40. As perhaps may be seen most clearly in FIGS. 17 and 40, each tower is preferably identical, with a lower mounting hole 318 for front springs 200, 203 and an upper mounting hole 320 for rear springs 202, 204.

Washers 322 are located on each side of bushing 306, separated by a first spacer 324 to allow clearance for bushing to turn. A second spacer 326 distances bushing 306 from the side of the tower to allow clearance for the spring. A machine bolt 328 is received through either hole 318 or 320, with a backing washer 330 and lock nut 332 securing the spring mounting assembly to the tower.

Referring now to FIGS. 44-60, an alternative suspension system 488 for the practice of the present invention may be seen. Suspension system 488 is similar to suspension systems 88 and 288 described supra, except that it uses an alternative pivoting support 440 and an alternative spring mounting in the form of an alternative bushing 406. System 488 preferably uses the same damper element 208 described supra positively located by and concentric to pivoting support 440. Bushing 406 is a fixed, non-rotating type, used with both top and bottom end turns on springs 298. As shown, bushings 406 located at the top of towers 492 are adjustable to one of a plurality of settings, more particularly, to LOW, MEDIUM or HIGH settings or positions, as will be described more fully infra. Similar to suspensions 88 and 288, the suspension system embodiment shown in FIG. 44 may have elastomeric bumpers 459 to cushion the limit of pivoting motion of mixing frame 438 as it approaches base 442.

Figure 44:
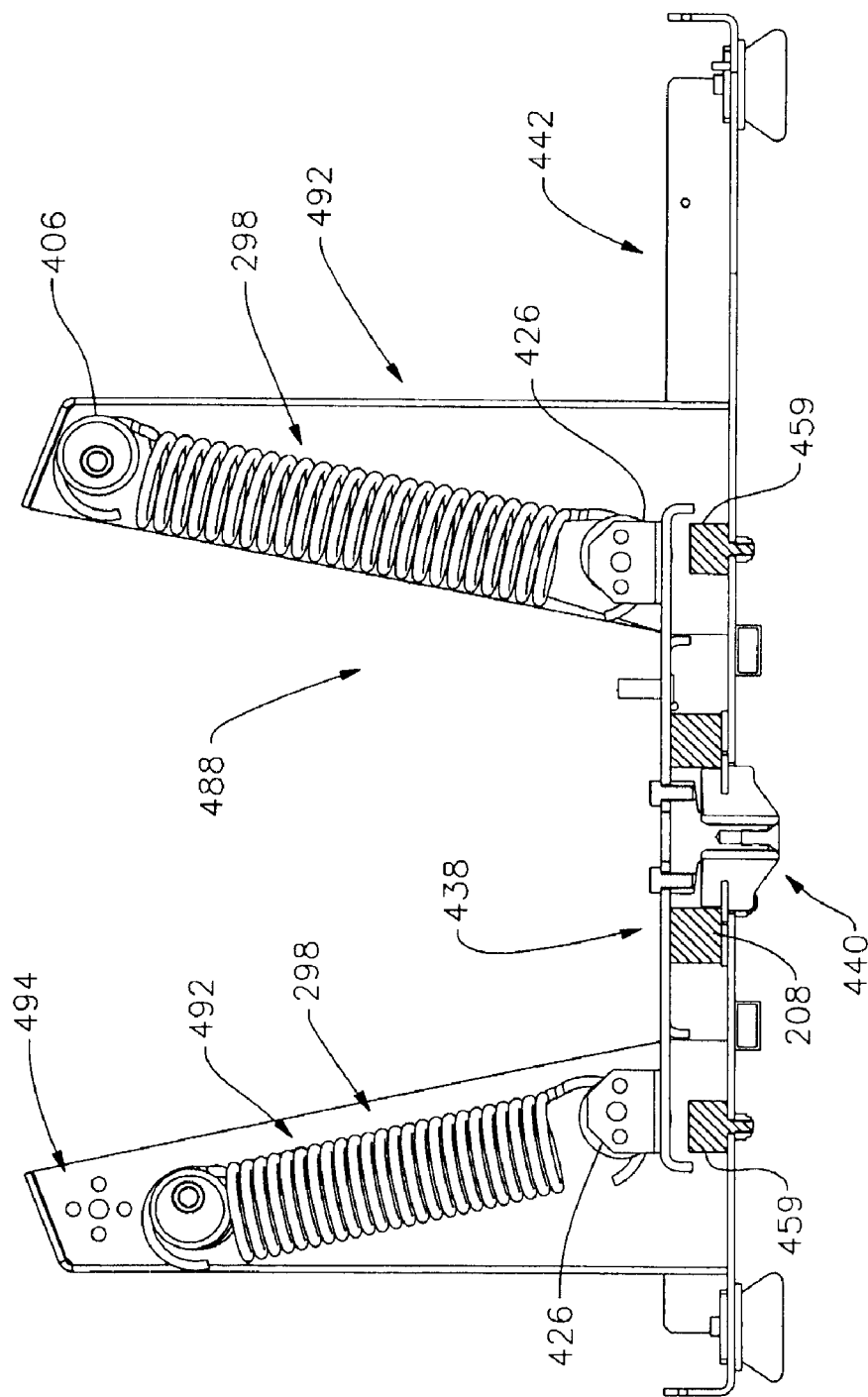
FIG. 44 is a side section view of an alternative suspension, mixing frame and base useful in the practice of the present invention.
Figure 45:
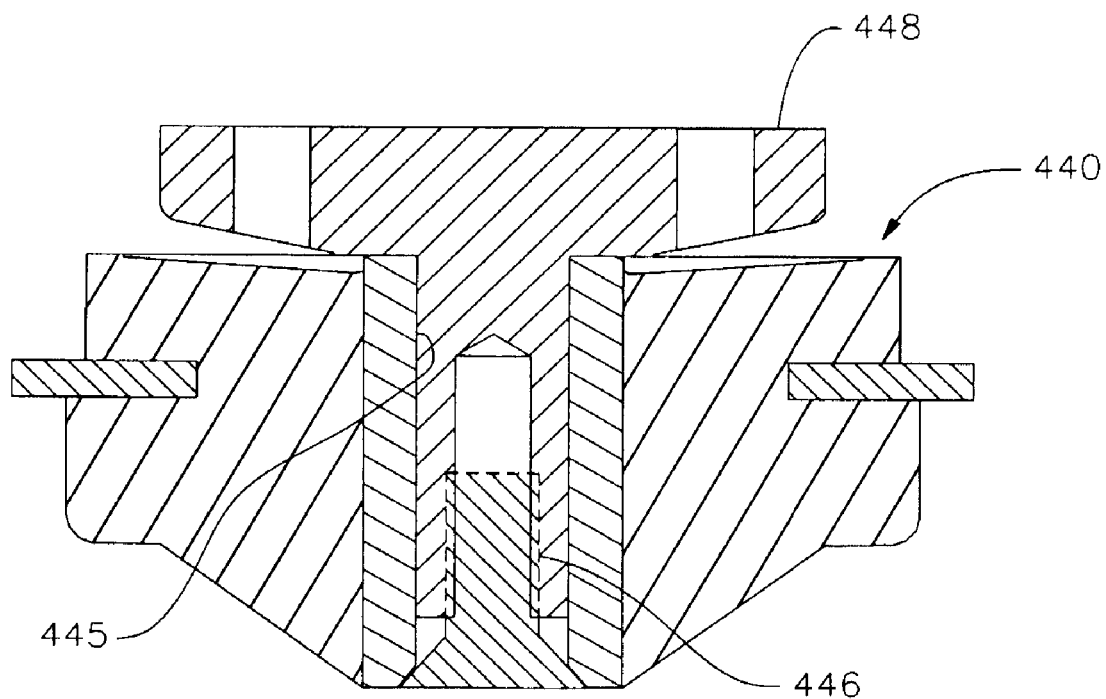
FIG. 45 is an enlarged section view of an alternative pivoting support.
Figure 46:
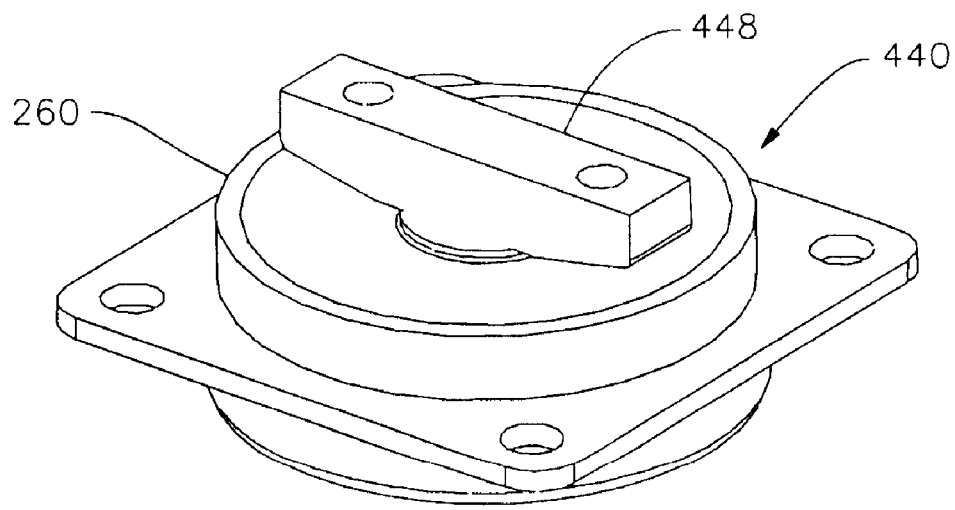
FIG. 46 is a perspective view of the pivoting support of FIG. 45.
Figure 49:
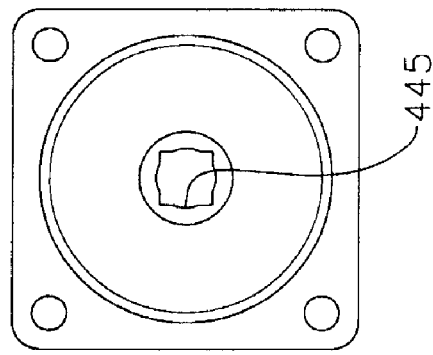
FIG. 49 is a plan view of the other side of the pivoting support of FIG. 47.
Figure 48:
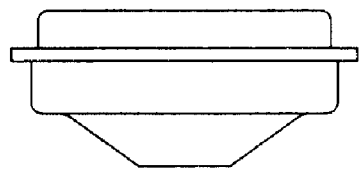
FIG. 48 is a side view of the pivoting support of FIG. 47.
Figure 47:
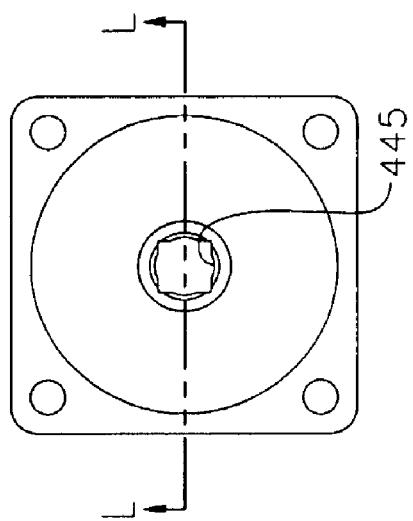
FIG. 47 is a plan view from one side of the pivoting support of FIG. 45 with an indexing structure removed.
Figure 50:
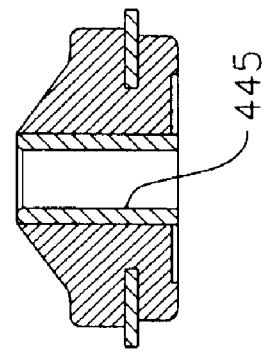
FIG. 50 is a side section view along line L-L of FIG. 47.
Figure 51:
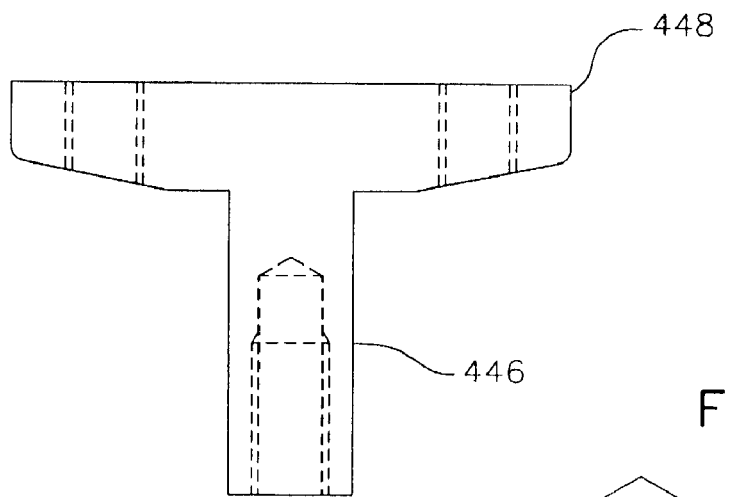
FIG. 51 is a side view of the indexing structure of the pivoting support of FIG. 45.
Figure 53:
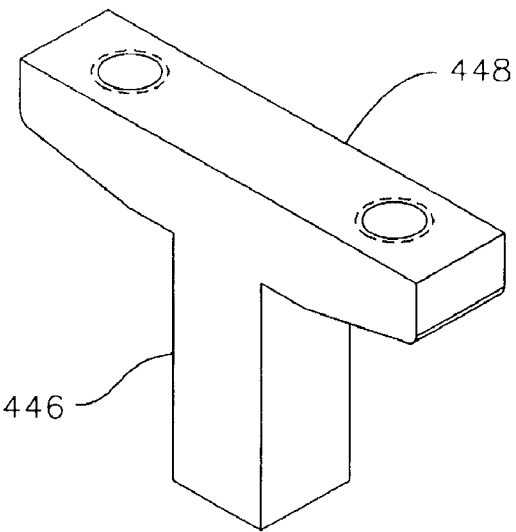
FIG. 53 is a perspective view of the indexing structure of FIG. 51.
Figure 52:
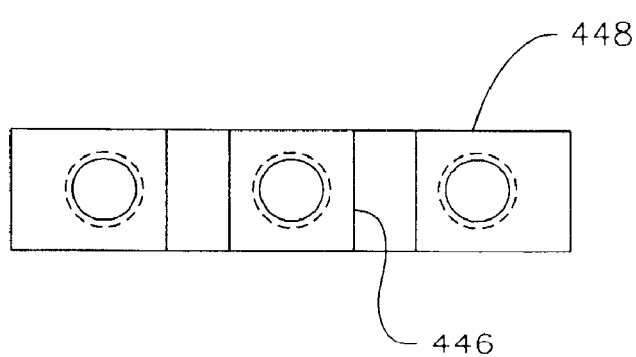
FIG. 52 is a bottom plan view of the indexing structure of FIG. 51.
Figure 54:
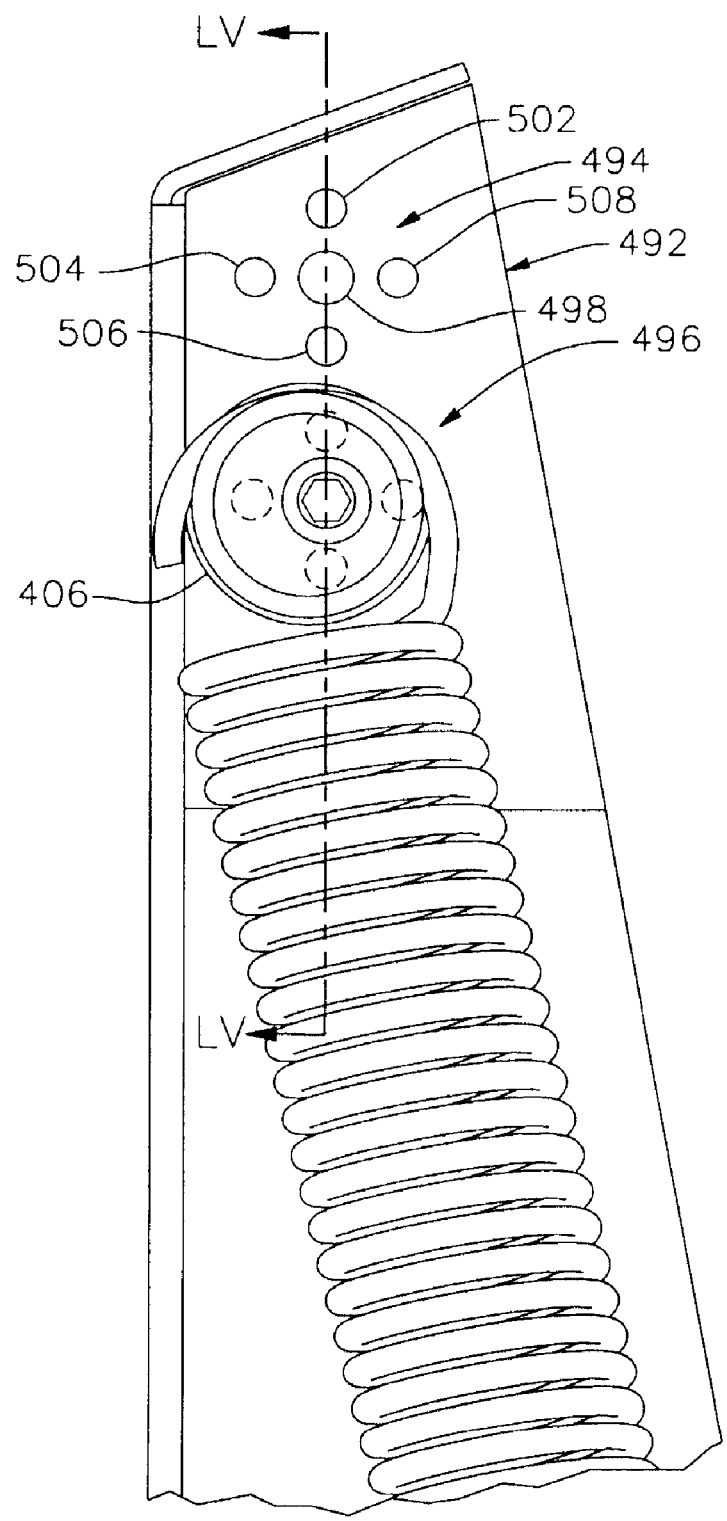
FIG. 54 is an enlarged fragmentary view of a spring and spring mounting tower with an alternative spring mounting bushing from FIG. 44.

Referring now most particularly to FIGS. 45-53, pivoting support 440 is similar to support 240, except that a square cross section hole 445 is broached in tube 252. The square hole is sized to closely receive a square cross section extension 446 of a T-shaped indexing structure 448. Structure 448 preferably has an integrally formed cross bar 450 with a pair of threaded apertures 452 to secure structure 448 to the mixing frame 438, using conventional threaded fasteners, as shown in FIG. 44. Using this arrangement will positively align the mixing frame 438 to the base 442. Optionally spacer ring 260 may be used with support 440, as shown in FIGS. 20 and 46, to positively locate damper element 208 concentrically with respect to the pivoting support 440. The remaining features of pivoting support 440 may be the same as those of support 240, described supra.

Referring now most particularly to FIGS. 42, 43 and 54-60, the bushing 406 may be seen to have a circumferential groove 410, which is preferably a V-groove. Groove 410 is preferably the same as the V-groove in bushing 306 described supra. Bushing 406 differs from bushing 306 in that bushing 406 is fixed and eccentric, and positionable to a selected one of a predetermined number of positions (four are shown) while bushing 306 is free to rotate and is concentric to its mounting. In bushing 406, a through bore 412 is located eccentrically to the circumferential groove 410. At least one and preferably two projections 414, 416 extend out from a mounting surface 418 of bushing 406, where the mounting surface is generally perpendicular to a cylinder axis of the circumferential groove 410 and bore 412, which are preferably parallel to each other.

Each tower 492 preferably has identical upper and lower hole patterns 494, 496, each made up of five apertures, with a central aperture 498 for receiving a threaded fastener 500 and four positioning apertures 502, 504, 506 and 508 having centers located on a circle sized to receive projections 414 and 416. More or fewer positioning apertures may be provided, if desired, while still remaining within the scope of the present invention. Bushing 406 may be adjusted to accommodate variations in the length of springs 298 which may result from manufacturing tolerances for the springs. If projection 414 is received in positioning aperture 502, bushing 406 will be located for a minimum spring extension length. If projection 414 is located in positioning aperture 506, bushing 406 will be located for a maximum spring extension length. If projection 414 is located in either of positioning apertures 504 or 508, bushing 406 will be positioned for a "medium" spring extension length, about half way between the minimum and maximum. It is to be understood that the projection 416 will be automatically received in the positioning aperture which is diametrically opposite the positioning aperture in which projection 414 is received.

Referring again to FIG. 44, tower 492 to the left is a "front" tower and has the bushing 406 attached using the lower hole pattern 496, while the tower to the right is a "rear" tower and has the bushing 406 preferably attached using the upper hole pattern 494. It has been found to desirable to increase the spring extension length by the distance between the hole patterns 494 and 496 because of the additional weight (most notably caused by the motor) towards the rear of the mixing frame assembly. It has been found preferable to use bushing 406 for the lower end turn of each of springs 298, and to provide only "medium" positioning apertures 504 and 508 for lower end turns. However, it is within the scope of the present invention to provide more positioning apertures for the lower end turns of springs 298, if desired. The lower end turns of springs 298 are each secured to the mixing frame assembly by brackets 426 holding bushings 406.

Figure 55:
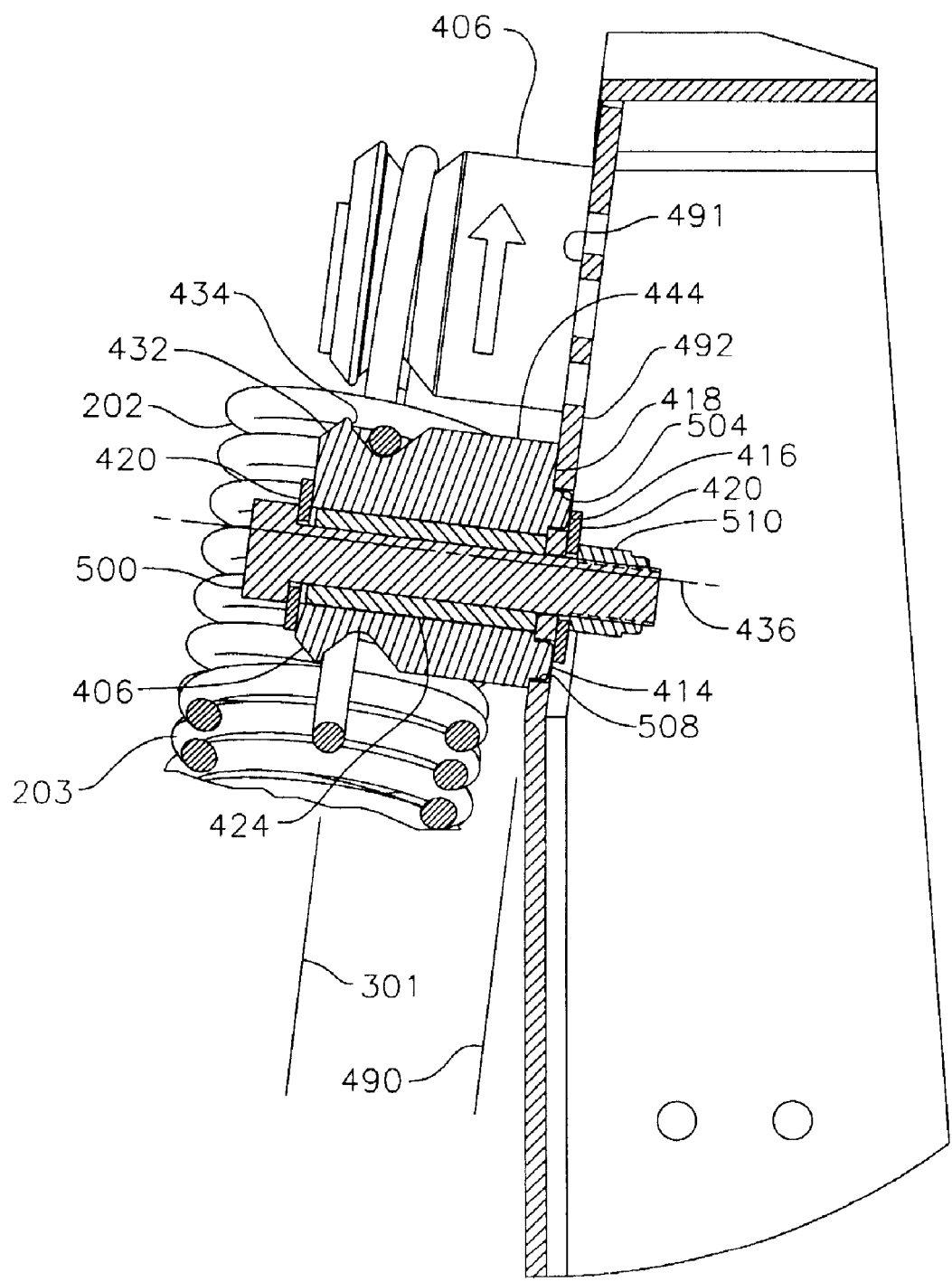
FIG. 55 is an enlarged fragmentary section view taken along line LV-LV of FIG. 18.
Figure 64:
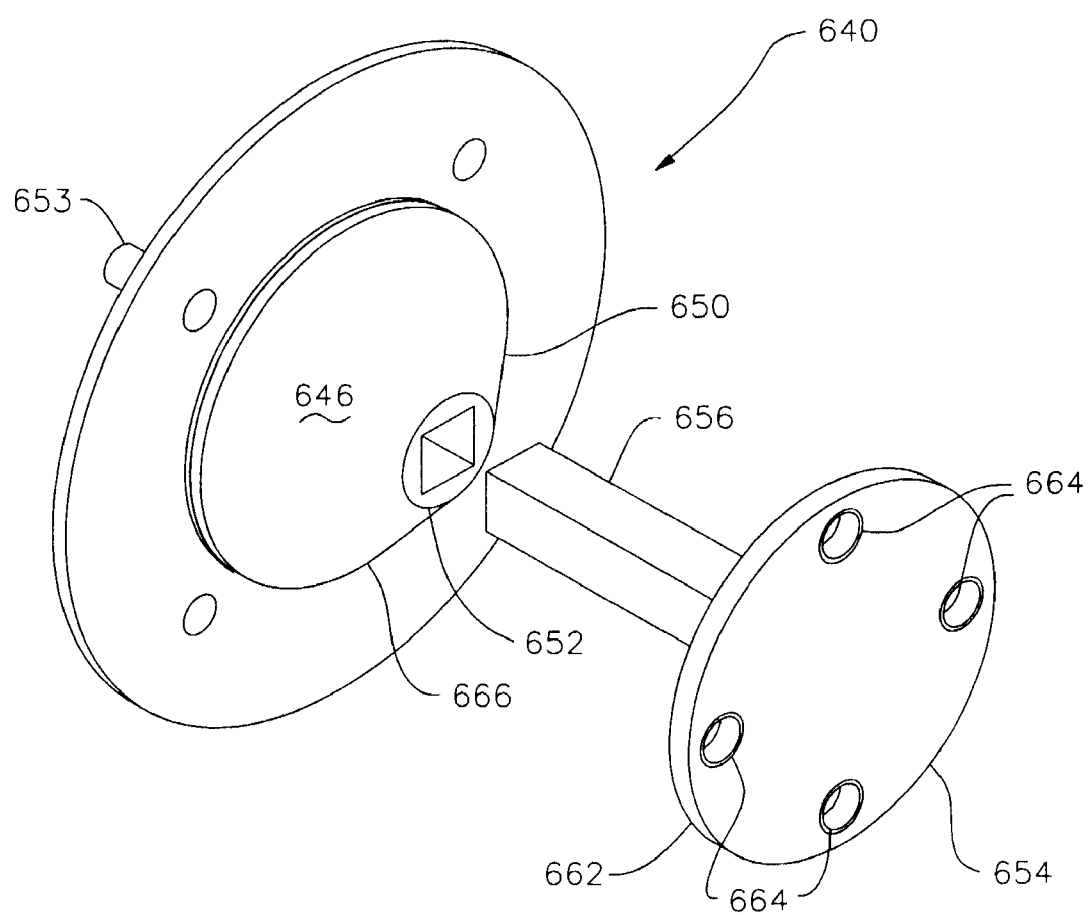
FIG. 64 is an exploded perspective view of the pivoting support of FIG. 61.
Figure 65:
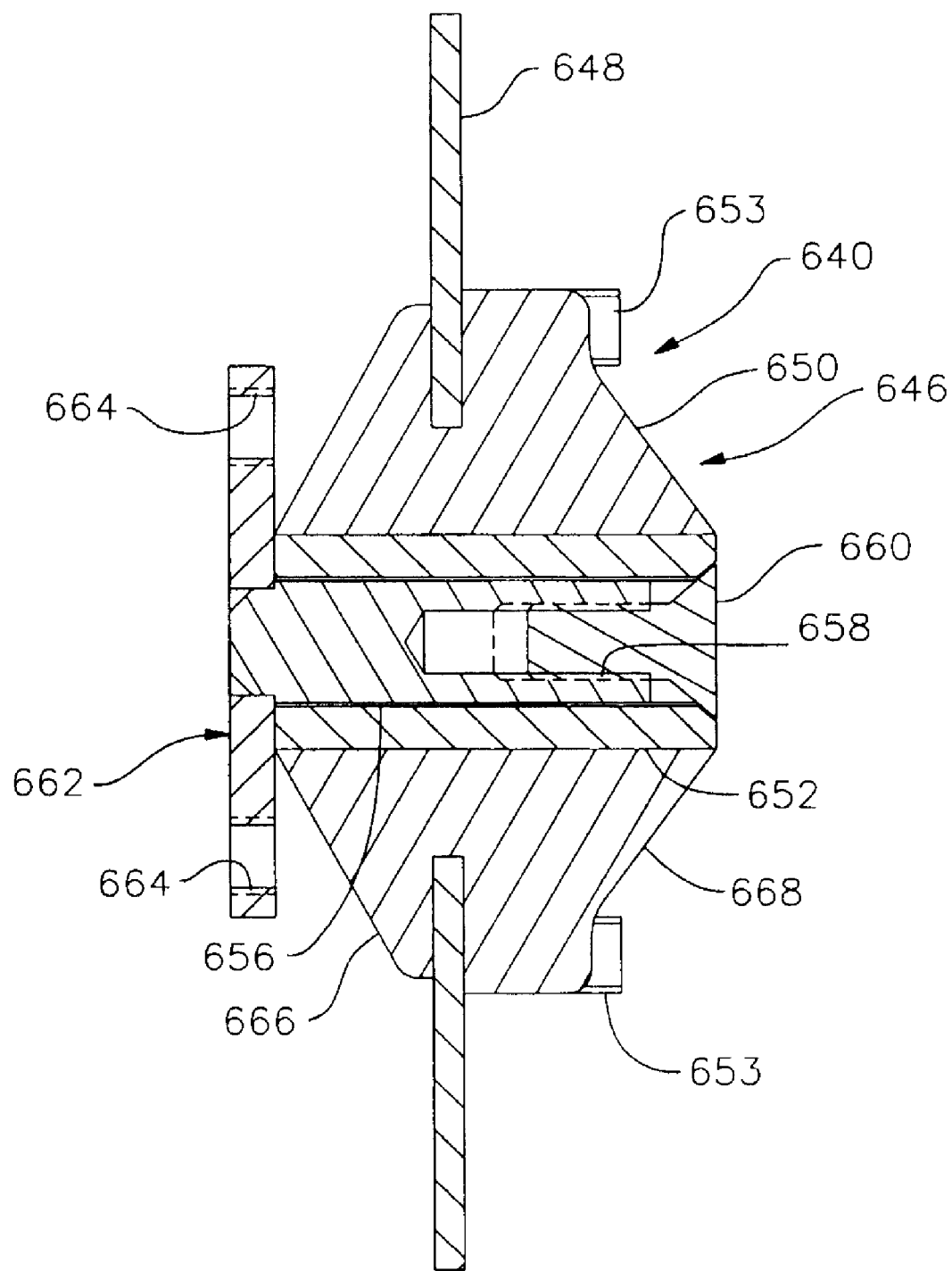
FIG. 65 is a side section view along line LXV-LXV of FIG. 62.

In FIG. 55, further details for the mounting arrangement of bushing 406 may be seen. It is to be understood that in this arrangement, the primary axis 301 of the spring 203 is perpendicular to a cylindrical axis 436 of the bushing 406. Axis 301 is parallel to the plane 490 of an angled upper surface 491 of tower 492. Angling surface 491 provides improved alignment of the spring with the bushing, more particularly, improved alignment of the end turn of the spring with the groove 308 of the bushing 406. A pair of washers 420 are received on threaded fastener 550, and a lock nut 510 secures the assembly shown in FIG. 55 together, holding the bushing 406 in a "maximum" position (i.e., a position in which a distance to the end turn is maximized) with projection 414 received in aperture 508 and projection 416 received in aperture 504. The width 405 of the entry to the circumferential groove 410 is to be understood to be substantially wider than the wire diameter of the end turn of the spring to be received in the groove 410.

Returning now to FIGS. 56, 57 and 59, visible indicia may be provided on bushing 406 in the form of one or more arrows 428, 430, with each of the arrowheads pointing toward each other. With the arrows pointing down, the bushing 406 is in the minimum position. With the arrows pointing up, the bushing is in the maximum position, and with the arrows pointing either left or right horizontally (as shown in FIG. 18), the bushing is in a "medium" position.

Bushings 306 and 406 may be made of an appropriate polymer, such as nylon or polyurethane, to provide for improved wear resistance and quiet operation of the mixer as it pivots. The respective spring end turn may be installed on bushing 406 by placing the end turn against a sloping conical section wall 432 on the bushing and urging the end turn into the V-groove. The groove 410 of bushing 406 has a short radial section 434 extending generally perpendicularly to the cylindrical axis 436 to retard the spring from disengaging itself from the groove 410. Bushing 406 also has an enlarged diameter shoulder 444 between groove 410 and mounting surface 418 to retard the spring from "walking" or moving out of groove 410 and towards the mounting surface 418.

Referring now to FIGS. 61 through 65, another alternative embodiment 640 for the pivoting support may be seen. Pivoting support 640 includes a plate 648 around which a support element 646 is formed, preferably by molding element 646 to plate 648. Support element 646 may include an elastomeric body 650 with an integrally molded tube 652 formed therein, with tube 652 having a square cross section hole 645 extending therethrough. Plate 648 may have threaded studs 653 extending therefrom. An indexing structure 662 may be formed by a second plate 654 welded to a square cross section projection 656 having internal threads 658 therein. A conventional threaded fastener 660 may be used to secure structure 662 to support element 646. Plate 654 may have a plurality of threaded holes 664 therein to receive and secure the mixing frame assembly as with previously described embodiments for the pivoting structure of the present invention. This embodiment may be seen to have conically shaped projections 666, 668 of the elastomeric element 650 projecting on opposite sides of plate 648. It has been found that providing the conically shaped projection 666 in the body 650 on the side facing the indexing structure 662 eliminates or reduces a stress riser that otherwise may precipitate and propagate one or more stress-induced cracks in the body, as for example, may occur with repetitive cycles of flexing the elastomeric body of the pivoting support.

This invention is not to be taken as limited to all of the details thereof as modifications and variations thereof may be made without departing from the spirit or scope of the invention. For example and not by way of limitation, it is within the scope of the present invention to provide or use the various aspects of the suspension system claimed herein with other mixers suitable to mix materials other than paints or similar coatings in cylindrical and non-cylindrical containers, with appropriate modifications, if and when needed.

What is claimed is:

1. An improved suspension system for a liquid vortex mixer of the type having a mixing frame assembly mounted for angular movement about a pivot with respect to a base, the improvement in combination therewith comprising at least one energy absorbing damper element located between the mixing frame assembly and the base spaced radially apart and separate from the pivot and formed of viscoelastic polymer material such that the at least one energy absorbing damper element absorbs energy when the mixing frame assembly pivots with respect to the base and deforms the at least one energy absorbing damper element and wherein the improvement further includes a pivoting support having an elastomer element bonded between a first metal mounting structure located peripherally of the elastomer element and a second metal mounting structure located centrally of the elastomer element, and an indexing structure connected to the second metal mounting structure positively orienting one of the mixing frame assembly and the base secured to the first metal mounting structure with the other of the mixing frame assembly and the base secured to the second metal mounting structure.

2. The improved suspension of claim 1 wherein the at least one energy absorbing damper element extends at least partially circumferentially around the pivot.

3. The improved suspension of claim 1 wherein the at least one energy absorbing damper element extends substantially completely around the pivot.

4. The improved suspension of claim 1 wherein the at least one energy absorbing damper element comprises a ring surrounding the pivot.

5. The improved suspension of claim 1 wherein the mixing frame assembly has a generally planar support member and the base is generally planar and the at least one energy absorbing damper element is located between the generally planar support member and the base.

6. The improved suspension of claim 5 wherein the at least one energy absorbing damper element at least partially encircles the pivot.

7. The improved suspension of claim 6 wherein the at least one energy absorbing damper element completely encircles the pivot.

8. The improved suspension of claim 1 wherein the mixing frame assembly and the base are assembled together with a predetermined preload applied to the at least one damper element.

9. The improved suspension of claim 8 wherein the predetermined preload is greater than the weight of the mixing frame assembly without a paint container.

10. The improved suspension of claim 8 wherein the predetermined preload tends to level the mixing frame assembly when it is at rest.

11. The pivoting support and indexing structure combination of claim 1 wherein the indexing structure further comprises a plurality of holes in a plate.

12. The improved suspension of claim 1 wherein the indexing structure comprises a keyed surface.

13. The improved suspension of claim 12 wherein the keyed surface comprises at least one flat on a cylindrical extension of the pivot.

14. An improved suspension system for a liquid vortex mixer of the type having a mixing frame assembly mounted for angular movement about a pivot with respect to a base, the improvement in combination therewith comprising at least one energy absorbing damper element located between the mixing frame assembly and the base spaced radially apart and separate from the pivot and formed of viscoelastic polymer material such that the at least one energy absorbing damper element absorbs energy when the mixing frame assembly pivots with respect to the base and deforms the at least one energy absorbing damper element;
wherein the improvement further includes at least one helical extension spring connected between the mixing frame assembly and the base, with the spring formed as a helix and each end of the spring having an end turn formed from the helix, and further comprising a bushing having a circumferential V-groove formed therein to receive an end turn, with the V-groove having an included angle large enough to permit misalignment of the end turn in the V-groove when the end turn of the spring is received on the bushing.

15. The improved combination of claim 14 wherein the spring has an end turn formed of spring wire and the spring wire has a characteristic diameter and the V-groove has an entry width greater than the characteristic diameter.

16. The improved combination of claim 14 wherein the bushing comprises an eccentric bore extending generally perpendicularly from a mounting surface of the bushing and further comprises at least one projection extending out from the mounting surface.

17. An improved suspension system for a liquid vortex mixer of the type having a mixing frame assembly mounted for angular movement about a pivot with respect to a base, the improvement in combination therewith comprising at least one energy absorbing damper element located between the mixing frame assembly and the base spaced radially apart and separate from the pivot and formed of viscoelastic polymer material such that the at least one energy absorbing damper element absorbs energy when the mixing frame assembly pivots with respect to the base and deforms the at least one energy absorbing damper element and wherein the pivot includes an indexing structure having a T-shaped member keyed to the pivot and positively orienting the mixing frame assembly with the base.

18. An improved suspension system for a liquid vortex mixer of the type having a mixing frame assembly mounted for angular movement about a pivot with respect to a base, the improvement in combination therewith comprising at least one energy absorbing damper element located between the mixing frame assembly and the base spaced radially apart and separate from the pivot and formed of viscoelastic polymer material such that the at least one energy absorbing damper element absorbs energy when the mixing frame assembly pivots with respect to the base and deforms the at least one energy absorbing damper element and wherein the pivot includes an indexing structure having a flange with apertures therein positively orienting the mixing frame assembly with the base.

* * * * *